United States Patent
Weiss et al.

(10) Patent No.: US 12,104,401 B2
(45) Date of Patent: Oct. 1, 2024

(54) SYSTEMS AND METHODS FOR FLOOD PREVENTION

(71) Applicant: GHW Solutions, LLC, Fort Worth, TX (US)

(72) Inventors: Jonathon Weiss, Fort Worth, TX (US); Gerry Graham, Fort Worth, TX (US); Stephen Graham, Austin, TX (US)

(73) Assignee: GHW Solutions, LLC, Fort Worth, TX (US)

( * ) Notice: Subject to any disclaimer, the term of this patent is extended or adjusted under 35 U.S.C. 154(b) by 0 days.

(21) Appl. No.: 18/456,156

(22) Filed: Aug. 25, 2023

(65) Prior Publication Data

US 2023/0407662 A1 Dec. 21, 2023

Related U.S. Application Data

(60) Division of application No. 17/348,495, filed on Jun. 15, 2021, now Pat. No. 11,795,723, which is a continuation-in-part of application No. 17/095,573, filed on Nov. 11, 2020, now Pat. No. 11,060,313, which is a continuation-in-part of application No. PCT/US2019/031838, filed on May 10, 2019.

(60) Provisional application No. 63/139,135, filed on Jan. 19, 2021, provisional application No. 62/983,834, filed on Mar. 2, 2020, provisional application No.
(Continued)

(51) Int. Cl.
*E04H 9/14* (2006.01)
(52) U.S. Cl.
CPC .................................. *E04H 9/145* (2013.01)

(58) Field of Classification Search
CPC . E04H 9/145; B29C 65/5014; B29C 65/5028; B29C 65/02; E02D 31/00; Y02A 10/30; E06B 2009/007
USPC .................. 52/169.14, 741.4, 742.13, 742.1
See application file for complete search history.

(56) References Cited

U.S. PATENT DOCUMENTS

| | | | | |
|---|---|---|---|---|
| 4,019,304 A | * | 4/1977 | Timm | ..................... E04H 9/145 52/746.1 |
| 4,375,929 A | * | 3/1983 | Clark | ..................... E04H 9/145 405/114 |

(Continued)

*Primary Examiner* — Brian E Glessner
*Assistant Examiner* — Adam G Barlow
(74) *Attorney, Agent, or Firm* — Crain Caton & James; William P. Jensen

(57) ABSTRACT

A comprehensive dry flood proofing solution to mitigate inland flooding risk for existing or new homes and small buildings. This family of integrated systems of the present disclosure each leverage the building's structure to offer practical and affordable flood protection for those buildings constructed with slab-on-grade foundations. This family of solutions includes pluggable weep holes, entry door/garage door/window protectors, wall appurtenances and penetration protection, house wrap and debris barrier system for wall protection and sewage anti-backflow protection. The components of the solution are reusable, easy to deploy, and do not detract from the building's permanent appearance. Furthermore, the solution allows for ingress/egress during flood events and can protect the building from standing water incursion up to 24" above slab elevation. The pre-flood design and preparation, the deployment immediately preceding flooding event and the subsequent removal after flooding event has passed is provided by both contractors and homeowners.

14 Claims, 31 Drawing Sheets

Related U.S. Application Data

62/835,076, filed on Apr. 17, 2019, provisional application No. 62/802,734, filed on Feb. 8, 2019, provisional application No. 62/787,939, filed on Jan. 3, 2019, provisional application No. 62/670,416, filed on May 11, 2018.

(56) References Cited

U.S. PATENT DOCUMENTS

| | | | | |
|---|---|---|---|---|
| 4,458,456 | A * | 7/1984 | Battle | E04H 9/145 52/63 |
| 4,488,386 | A * | 12/1984 | Thompson | E04H 9/145 52/746.1 |
| 4,693,042 | A * | 9/1987 | Villarreal | E02D 27/04 52/202 |
| 7,631,371 | B2 * | 12/2009 | Dollar | A45C 15/00 4/449 |
| 10,844,563 | B1 * | 11/2020 | Coleman | E02B 3/106 |
| 11,401,678 | B1 * | 8/2022 | Schwartz | E04H 9/14 |
| 11,629,549 | B2 * | 4/2023 | Dahl | E04H 9/145 160/351 |
| 2004/0045243 | A1 * | 3/2004 | Lockwood | E04H 9/145 52/169.14 |
| 2010/0101161 | A1 * | 4/2010 | Dudash | E06B 1/62 52/202 |
| 2013/0219802 | A1 * | 8/2013 | Willis | E06B 9/00 52/2.21 |
| 2019/0017315 | A1 * | 1/2019 | Barresi | E04H 9/145 |

* cited by examiner

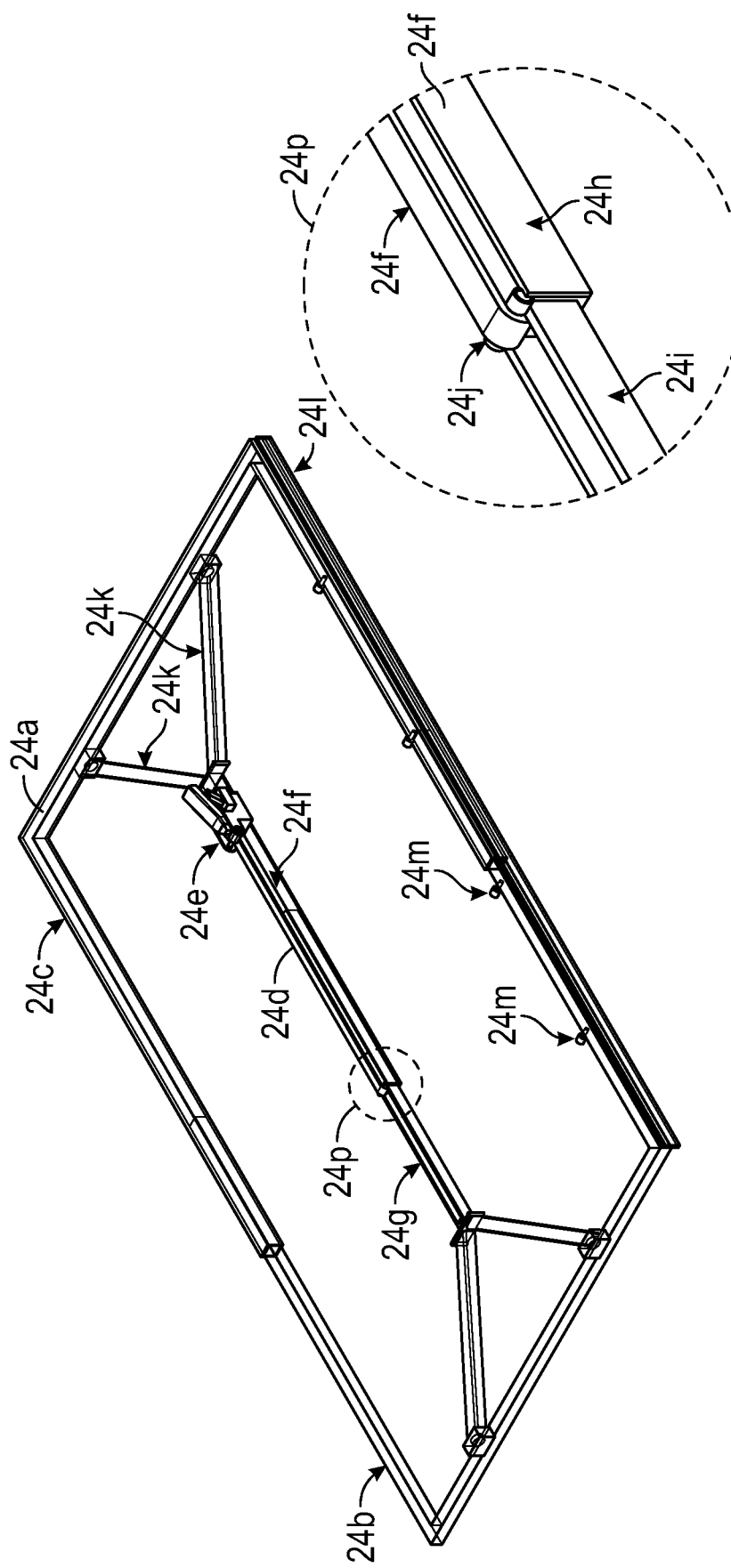

SYSTEMS AND METHODS FOR FLOOD PREVENTION

RELATED APPLICATIONS

This application is a divisional of U.S. application Ser. No. 17/348,495, filed Jun. 15, 2021, which claims priority to U.S. Provisional Application No. 63/139,135, filed Jan. 19, 2021, and is a continuation-in-part of U.S. Pat. No. 11,060, 313, which claims priority to U.S. Provisional Application No. 62/983,834, filed Mar. 2, 2020, and is a continuation-in-part of PCT Application Serial No. PCT/US19/31838, filed May 10, 2019, which claims priority to U.S. Provisional Application No. 62/835,076, filed Apr. 17, 2019, U.S. Provisional Application No. 62/802,734, filed Feb. 8, 2019, U.S. Provisional Application No. 62/787,939, filed Jan. 3, 2019, and U.S. Provisional Application No. 62/670,416, filed May 11, 2018, each of which are incorporated herein by reference.

FIELD OF THE DISCLOSURE

The following disclosure generally relates to systems and methods for flood prevention. More particularly, the following disclosure relates to a removable, reusable dry flood proofing solution that is easy to deploy on short notice before a flood and economically leverages the structural support of the home.

BACKGROUND

Many communities around the world are facing the challenges and devastation caused by flooding due to the increasing frequency of severe weather events, rising sea level, subsidence and urban sprawl. Most agree that massive infrastructure projects aimed at flood control will never eliminate regional flooding in densely developed areas. Cities cannot be redesigned to incorporate dedicated catch basins, sufficient in size, to collect and control stormwater runoff from flooding caused by heavy precipitation. There is little doubt that torrential rains will continue to result from hurricanes and other storm-related events. Structures in populated areas along the thousands of miles of U.S. coastline and inland areas proximate to the Atlantic and Gulf of Mexico will continue to be exposed to flooding caused by major precipitation events, storm surge and other contributory causes. However, flooding of this nature is not limited to our domestic areas; it is of worldwide concern.

Flooding from Hurricane Harvey in late August 2017, for example, caused widespread destruction in the greater Houston area. Flooding due to heavy rains from Harvey damaged more than 200,000 homes and businesses. Superstorm Sandy was another costly weather event in recent history that damaged or destroyed at least 650,000 homes in the northeast part of the U.S. Hurricane Katrina in 2005 was the most destructive natural disaster in U.S. history causing total damages of about $150 billion and flooding of more than a million homes in and around New Orleans. Climatologists and meteorologists are convinced heavy precipitation storms are becoming more frequent and getting stronger, and lasting longer. Coastal, riverine and surface flooding will continue to threaten millions of homes and other buildings located in low lying areas around the world which brings significant adverse consequences to building owners, lenders, insurance/re-insurance providers, federal/local governments and other stakeholders.

In response to major, catastrophic flooding, various flood barrier systems have been developed for different applications and/or structures. Many conventional flood barrier systems, however, require expensive, unsightly, permeant structures that surround the home or other building. Others are removable, but are not practical for deployment on short notice, fail to economically leverage the structural support of the home and/or are not reusable.

BRIEF DESCRIPTION OF THE DRAWINGS

The present disclosure is described with reference to the accompanying drawings, in which like elements are referenced with like reference numbers, and in which:

FIG. 8 is a perspective view of the protector assembly in FIGS. 6 and 7.

FIG. 9 is an expanded view of the area 24*p* in FIG. 8.

DETAILED DESCRIPTION OF THE ILLUSTRATIVE EMBODIMENTS

Figure 1:
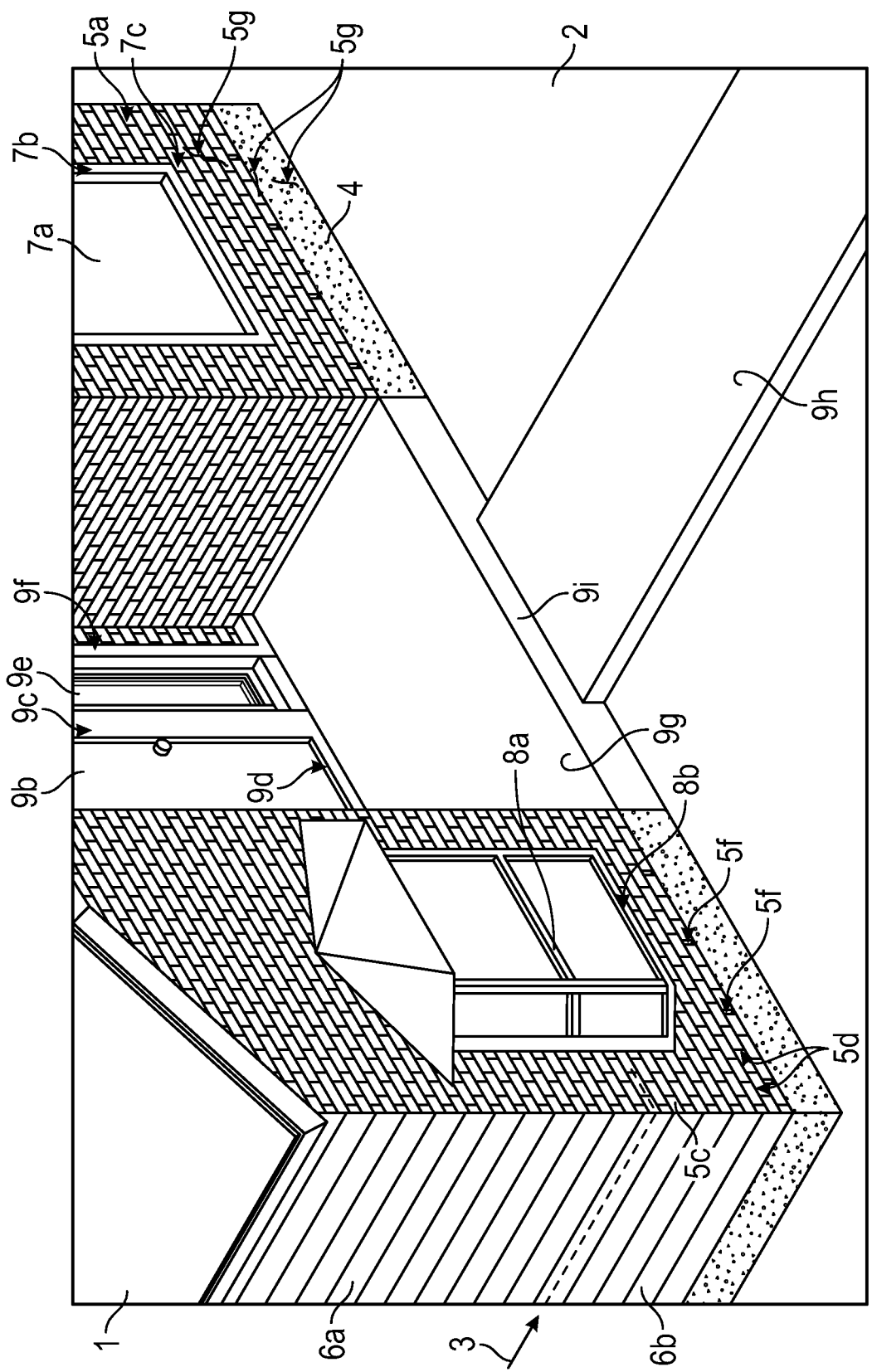
FIG. 1 is a perspective view of a typical home with different types of exterior wall materials.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures and dimensions described herein are only exemplary and are not intended to assert or imply any limitation with regard to the environment, architecture, design, or process in which different embodiments may be implemented. For convenience, a list of components identified by the figures is provided in Table 1 below.

TABLE 1

| Number | Description | Number | Description | Number | Description |
| --- | --- | --- | --- | --- | --- |
| 1 | Building | 2 | GLE | 3 | DFE |
| 4 | Concrete Foundation | 5a | Exterior Brick Veneer Walls | 5b | Inner Sheathing Walls |
| 5c | Permeable Bricks | 5d | Mortar Seams | 5e | Ventilation Cavity |
| 5f | Existing Weep Holes | 5g | Cracks and Other Defects | 6a | Composite Sliding Exterior Walls |
| 6b | Composite Siding Planks | 7a | Recessed Windows | 7b | Recessed Window Frames |
| 7c | Recessed Window Sills | 8a | Bay Windows | 8b | Bay Window Frames and Sills |
| 9a | Exterior Entryway | 9b | Front Entryway Door | 9c | Door Frame |
| 9d | Entryway Windows | 9e | Entryway Window Glass | 9f | Entryway Window Casings |

TABLE 1-continued

| Number | Description | Number | Description | Number | Description |
|---|---|---|---|---|---|
| 9g | Front Porch Substrate | 9h | Walkway Substrate | 9i | Transition Step |
| 10a | Exterior Door | 10b | Door Frame and Jambs | 10c | Door Threshold |
| 12a | Non-sectional Garage Door | 12b | Sectional Garage Door | 12c | Panels of Sectional Garage Door |
| 12d | Frames of Garage Door | 12e | Bottom Edge of Garage Door | 12f | Driveway Substrate |
| 13 | Exhaust Vent | 14 | Other Wall Penetrations | 15 | Electrical/Plumbing Appurtenances |
| 16a | Toilet | 16b | Wax Seal Ring | 16c | Trapway |
| 16d | PVC Sewage Pipe | 17a | Shower and Floor Drains | 17b | Substrate Next to Drains |
| 18a | New Weep Holes | 18c | Weep Hole Sealing Plugs | 18d | Weep Hole Screen Inserts |
| 19 | Drain Holes at DFE | 20a | Wall Receptacle and Vent Cover Apparatus | 20b | Exhaust Vent Housing |
| 20c | Gasket for Housing | 20d | Mounting Holes for Housing | 20e | Steel Fasteners for Housing |
| 20f | Anchor Claws for Housing | 20g | Threaded Stud | 20h | Threaded Nut |
| 20i | Sealing Washer | 20j | Snorkel Riser for Housing | 20k | Receptacle Fitting of Housing |
| 20m | O-Ring Seal at Housing Fitting | 20n | Hooded Vent of Snorkel Riser | 20o | Center Hole of Housing |
| 20p | Plug for Housing Center Hole | 21a | Wrap-around Cone for Electrical / Plumbing Appurtenances | 21b | Water Proof Sealant |
| 22a | Toilet Plug Assembly | 22b | Plug Bladder | 22c | Plug Flex Tube |
| 22f | Schrader Valve | 23a | Drain Seal Gasket | 23b | Disk for Drain Seal |
| 23c | Support Structure for Drain Seal | 23d | 5-Gallon Bucket | 24a | Door and Window Protector Assembly |
| 24b | Male Frame | 24c | Female Frame | 24d | Strap Apparatus |
| 24e | Tightening Device | 24f | Strap | 24g | Expansion Bar |
| 24h | Female Square Tube | 24i | Inner Male Square Tube | 24j | Spindle |
| 24k | V-Arms | 24l | Adjustable Plate | 24m | Small Bolts |
| 24n | Foam Gaskets | 24o | Waterproof Elastic Sleeve | 24p | An Area |
| 25 | Lattice Panels | 26 | All Weather Tape | 27a | An Area |
| 27b | An Area | 27c | An Area | 28a | Zipper Strips |
| 28b | Butyl Tape | 28c | Zipper Connections | 30a | Sheeting Panel |
| 30b | Zipper Connection | 30c | Integral Sleeve | 31a | Vertical Wall Risers |
| 31b | Flange | 31c | 1/4" Hex Bolt | 31d | Masonary Anchor |
| 31e | Square Tube Riser | 31f | Rounded Cap | 31g | Integral Tab |
| 32a | Poly-Wrap Stiffeners | 32b | Female Coupler | 33 | Top Seal Gaskets |
| 34 | Top Seal Clips | 35a | Sheeting Panel Containers | 35b | Container Door |
| 35c | Container Hinges | 35d | Container Latches | 36a | Spring Bar |
| 36c | Spring Bar Foam Gaskets | 36d | Spring Bar Zipper Gaskets | 36e | Female Zipper Connections |
| 36f | 5/16" hole | 36g | Screw Fasteners | 36h | Pre-Set Threaded Anchors |
| 36i | Bolt Fasteners | 37 | Batting Panels | 38a | Zipper Mats |
| 38b | Zipper Matt Base Material | 38c | Dual Female Zipper Connection | 38d | Closed-Cell Foam Strip |
| 38e | Weighting Material | 39a | Garage Door Risers | 39b | 24" Tall Vertically Oriented Riser |
| 39c | 1" Square Tube with a Tab or Clip | 39d | Outer Riser Stud | 39e | Aluminum or Steel Base Plate |
| 39f | Inner Frame | 39g | 1/4" Welded Nut | 39h | Riser Tightening Apparatus |
| 39i | 2.5" Long Threaded Bolt | 39j | 3/4" Threaded Pressure Plate | 40a | Support Struts |

TABLE 1-continued

| Number | Description | Number | Description | Number | Description |
|---|---|---|---|---|---|
| 40b | 1/4" Threaded Masonary Anchors | 40c | Bolt Fasteners | 41 | L-Shaped Corner Braces |
| 42 | Corner Protectors | 43a | Entryway Protectors | 43b | Bottom of Frames/Female Square Frame |
| 43c | Square Tube Male Frame | 43d | Aluminum Struts | 43e | Aluminum Struts |
| 43g | Hex Bolts | 44a | Expansion Bars | 44b | Aluminum or PVC Cross Support Struts |
| 44c | C-Shaped End Clips | 45a | Barrier Netting | 45b | Barrier Tension Bar |
| 45c | J-Hook Flat Washers | 45d | 5/16" Pre-Drilled Holes | 45e | Spacer Blocks |
| 45f | Hook and Loop Fasteners | 45g | Threaded Anchors | 45h | 1/4" Bolts |
| 45j | Tensioner | 45k | Zip Ties | 51a | Removable All Weather Adhesive |
| 51b | Removable All Weather Single-sided Gel Tape | 52 | Fitted Waterproof Door Sleeve | 53 | Neoprene Sheeting Material |
| 54 | Upper Velcro ®-like Hook and Loop Attachment Assembly | 55 | Length of Loops Side Strap for Upper Attachment Assembly | 56 | Length of Hooks Side Strap for Upper Attachment Assembly |
| 57 | Lower Velcro ®-like Hook and Loop Attachment Assembly | 58 | Length of Loops Side Strap for Lower Attachment Assembly | 59 | Length of Hooks Side Strap for Lower Attachment Assembly |
| 60 | Vertically Oriented Velcro ®-like Loops Only Strap | 61 | Vertically Oriented Velcro ®-like Loops Only Strap | 62 | Suitable Attachment Means |
| 63 | Door Hinge Cut-Out | 64 | Approximate Location of 10b and 10c After Deployment | 67 | Lowermost Door Hinge |

The present disclosure is directed toward a comprehensive dry flood proofing solution with integrated reusable components that are easy-to-deploy within a few hours immediately preceding a flood event. All potential leak points into a building to a design flood elevation (DFE) of up to 24 inches from the top of a solid concrete foundation are addressed. The solution is suitable for existing homes, new homes and other building structures whereby the lowermost sections of the exterior walls are constructed using brick veneer, rock, stucco, wood/vinyl/composite siding, and/or other materials, which are sufficient to withstand the hydrostatic pressure caused by gently rising water up to the height of the DFE without structural failure. The suggested DFE height limitation of this disclosure is to mitigate possible damage to the foundation and other structural components of the building caused by buoyancy forces caused by rising flood waters on the outside of the house exceeding the weight of the structure and collapse forces related to the hydrostatic pressure applied against the exterior walls below the DFE.

The integrated dry flood proofing technology of the present disclosure also leverages the structural integrity of the building's concrete foundation and its exterior walls together with innovative solution components to enable cost effective protections, while allowing for ingress and egress during flood events. The solution includes a pre-flood design and preparation process (pre-flood prep), which should be completed in fair weather well in advance of any storms. The pre-flood prep process generally includes inspecting the home, designing the customized dry flood proofing solution, and preparing the landscape in close proximity to the building structure (e.g. trimming shrubbery), exposed concrete slab, and house exterior from ground level elevation (GLE) to the DFE (e.g. pressure washing) for application of the treatments and installation of solution components. In addition, certain building construction defects are addressed (e.g. cracks in exposed concrete foundation), exterior masonry walls are sealed to the DFE, pluggable retrofitted weep holes are installed, and deployable solution components are custom-fitted and labeled during the pre-flood prep process to facilitate emergency deployment by two or more physically capable adults during inclement weather.

The systems and methods disclosed herein thus, overcome the prior art disadvantages associated with conventional flood barrier systems with a house wrap system that is reusable, easy to deploy on short notice and economically leverages the structural support of the home or building. The house wrap system disclosed herein is also durable and will not detract from the appearance of the home. The benefits further extend to other stakeholders including, but not limited to, federal and local governments, insurance companies, mortgage lenders and home owner associations.

In one embodiment, the present disclosure includes a method for protecting a home or building with a slab-on-grade foundation from flood waters, which comprises: i) determining a size and number of waterproof, flexible sheet(s) needed to protect the home or building from flooding between the foundation and a predetermined design flood elevation (DFE); ii) positioning each flexible sheet along a section of the foundation, one at a time, to form a bottom-end horizontal water-resistant barrier, a top-end horizontal water-resistant barrier and a pair of side vertical water-resistant barriers; and iii) securing each flexible sheet to an exterior surface of the home or building using a removable adhesive along a perimeter of each respective flexible sheet to form a water-resistant barrier between each flexible sheet and at least one of an exterior wall, a door, and a window, wherein the removable adhesive is a double-sided tape and comprises: a) a non-removable film adhesive on one side of the double-sided tape for adhesion along the perimeter of each respective flexible sheet: and b) a removable adhesive gel on another side of the double-sided tape for adhesion to porous and non-porous surfaces in wet or dry conditions.

In another embodiment, the present disclosure includes a method for protecting a home or building with a slab-on-grade foundation from flood waters, which comprises: i) confirming an exterior door is properly aligned with a respective door frame, a sill, and a threshold; ii) confirming the exterior door and the respective door frame are in working condition and are effectively sealed below the DFE; iii) determining a size of a waterproof flexible sleeve needed to protect the exterior door of the home or building from flooding between a bottom of the exterior door and a predetermined DFE; iv) positioning the flexible sleeve around and under the bottom of the exterior door, around each lower edge of the exterior door and around a portion of an interior lower end of the exterior door; v) securing the flexible sleeve to the exterior door; and vii) closing the door to compress the flexible sleeve and form a water resistant barrier up to the predetermined DFE.

In yet another embodiment, the present disclosure includes a method for protecting a home or building with a slab-on-grade foundation and at least one masonry-veneer exterior wall from flood waters, which comprises: i) applying a concrete chemical sealant to at least one masonry-veneer exterior wall of the home or building between the foundation and a predetermined DFE; ii) covering each weep hole in the at least one masonry-veneer exterior wall with a respective strip of removable tape, wherein one side of the removable tape includes an adhesive gel to form a water resistant barrier between the removable tape and each respective weep hole; and iii) removing each strip of removable tape from the at least one exterior wall with at least one of tensile force, heat, a cooling stream, and a high pressure water force.

FIG. 1 illustrates a perspective view of an existing building 1 constructed using a combination of brick-veneer exterior walls 5a and composite siding exterior walls 6a over a solid concrete foundation 4, which includes recessed windows 7a, bay windows 8a, entryway windows 9d, a door at the front entryway 9b, front porch substrate 9g, walkway substrate 9h, a transition step from the walkway to the front porch 9i, mortar seams 5d in the brick-veneer walls 5a, and existing weep holes 5f formed by excluding the mortar from vertical seams along the first row of bricks of wall 5a adjacent to the top of the concrete foundation 4 at a spacing typically not greater than 33 inches. Potential water entry locations during a flooding event from GLE 2 to the DFE 3 of up to 24 inches above the top of concrete slab 4 include (a) existing weep holes 5f, (b) permeable bricks 5c of walls 5a, (c) cracks and other defects 5g in the concrete foundation 4 and masonry exterior wall 5a, (d) planks 6b of composite siding walls 6a, (e) frames, jambs, sills, and thresholds 9c, 9d of door 9b, and (f) frames, jambs, sills, and casings 7b, 7c, 8b, and 9f of windows 7a, 8a, and 9e.

Figure 2:
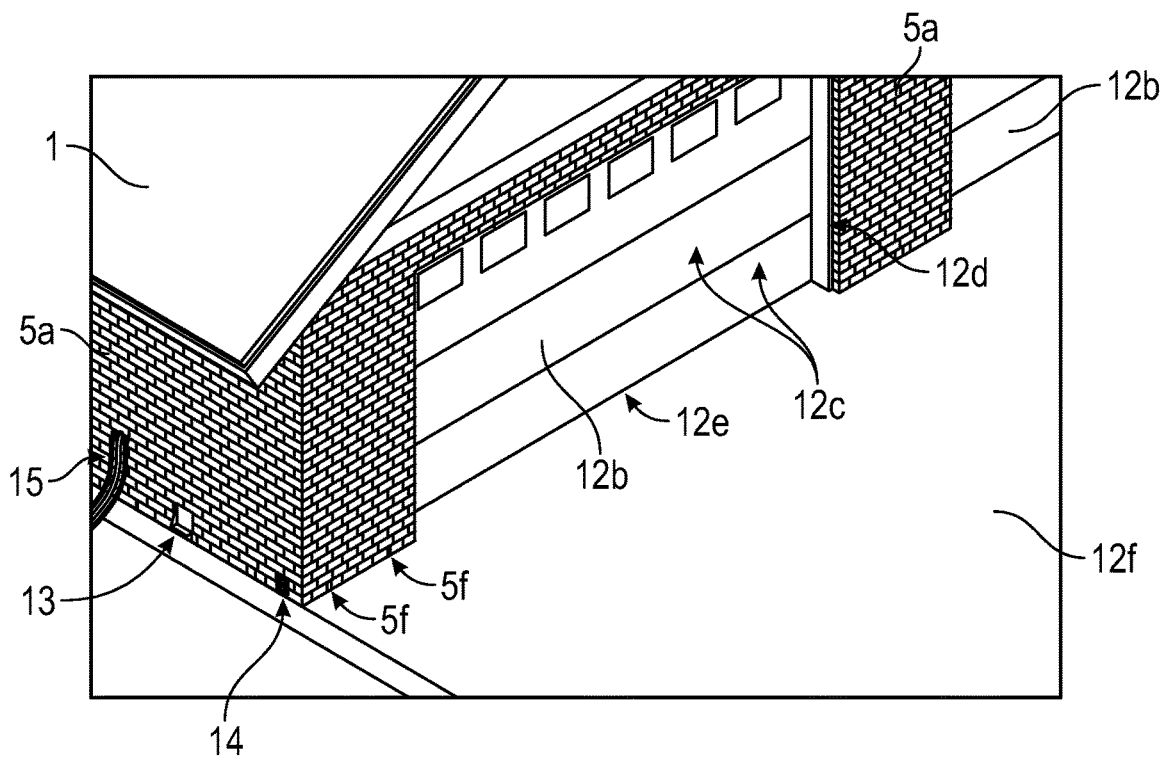
FIG. 2 is another perspective view of a typical home showing a garage and other features.

FIG. 2 illustrates another perspective view of building 1 highlighting additional potential leak points during a flooding event including (a) between the panels 12c of a sectional-type garage doors 12b, (b) along the bottom 12e of garage doors 12b adjacent to driveway 12f, (c) along the frames 12d of garage doors 12b, (d) exhaust vent 13, (e) electrical outlet 14, and (f) electrical, plumbing, and HVAC wall penetrations 15. In addition to potential leak points along the exterior of the house, flood waters can also cause sewage backup into toilets, shower, bathtub, and other drains located in the interior of the house on the ground floor.

The present disclosure includes five main integrated systems to protect existing homes from water encroachment during moderate flooding events into each of the previously described potential leak points: (a) Pluggable Weep Hole System, (b) Door and Window Protectors, (c) Wall Appurtenance Protection System, (d) Sewage Anti-Backflow System, and (e) House Wrap System.

Pluggable Weep Hole System:

The Pluggable Weep Hole System includes retro-fitting homes constructed with masonry-veneer exterior walls with pluggable weep hole having integral removable screen inserts, and further sealing all masonry leak points below the DFE with specialty chemicals. By design, exterior walls constructed with masonry-veneer are not waterproof and can become saturated during extended rainy weather events causing moisture to build-up in the annulus between the exterior masonry veneer and sheathing material of the interior structural wall. International Building Code (IBC) Section R703.7.6 requires weep holes be provided immediately above the flashing at the top of the concrete foundation with a maximum spacing of 33" and a diameter of not less than 3/16" to allow for drainage and air circulation to reduce long-term moisture build-up in this annulus space. Weep holes may also be located below exterior windows. For homes constructed using brick-veneer exterior walls, weep holes are typically formed by not applying mortar to approximately every second or third vertical joint on the first row of bricks adjacent to the concrete foundation. Weep holes provide an unwanted entry point for mice, lizards, snakes, wasps, bees, cockroaches, and other pests. Also, during flooding events, weep holes represent a problematic water leak point into the interior of the building.

To address these issues, the pre-flood prep process for homes constructed with masonry-veneer exterior walls includes first trimming low-lying shrubs and landscape growing within approximately 12" of the house exterior walls and foundation. Note that in cases where the House Wrap System will also be used for redundant protections, landscaping modifications may be necessary to expose at least 4" of vertical workspace along the side of the concrete foundation and/or to remove vines and other shrubbery growing against the exterior wall from GLE to the DFE.

Figure 3:
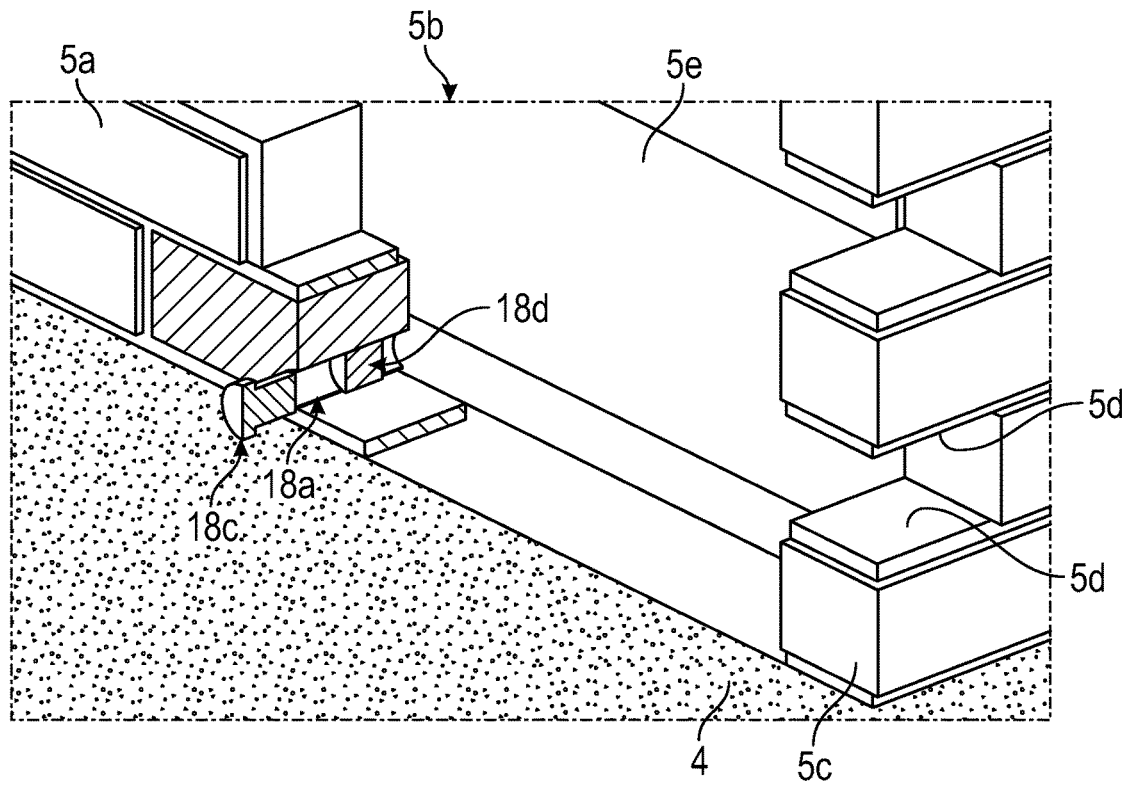
FIG. 3 is a perspective view of the home in FIG. 1 with a cut away illustrating a newly formed weep hole and weep hole plug.

Referring back to FIG. 1, the exposed side of the concrete foundation 4 and exterior brick-veneer walls 5a is cleaned using a water pressure washer from GLE 2 to the DFE 3 to prepare the surfaces for application of sealant chemical products. Grout sealant containing waterproofing agents and materials to match the color and texture of the existing mortar 5d is used to completely seal existing weep holes 5f after first inserting a flexible spacer device into each weep hole 5f to ensure the grout does not extrude into the ventilation cavity 5e located between the exterior wall 5a and the inner sheathing wall 5b immediately above the concrete foundation 4 as shown in FIG. 3. The grout sealant is applied with a consistent thickness to permanently seal the weep holes 5f from water intrusion during flooding after the sealant cures. A veneer of the same color and texture-matched grout sealant is also used to repair and permanently seal all of the existing mortar joints 5d along walls 5a from GLE 2 to the DFE 3 during pre-flood prep. Wall construction defects and leak paths 5g in the concrete slab 4 and exterior masonry-veneer walls 5a between GLE 2 and the DFE 3 are then repaired using suitable chemical sealant products.

Figure 4:
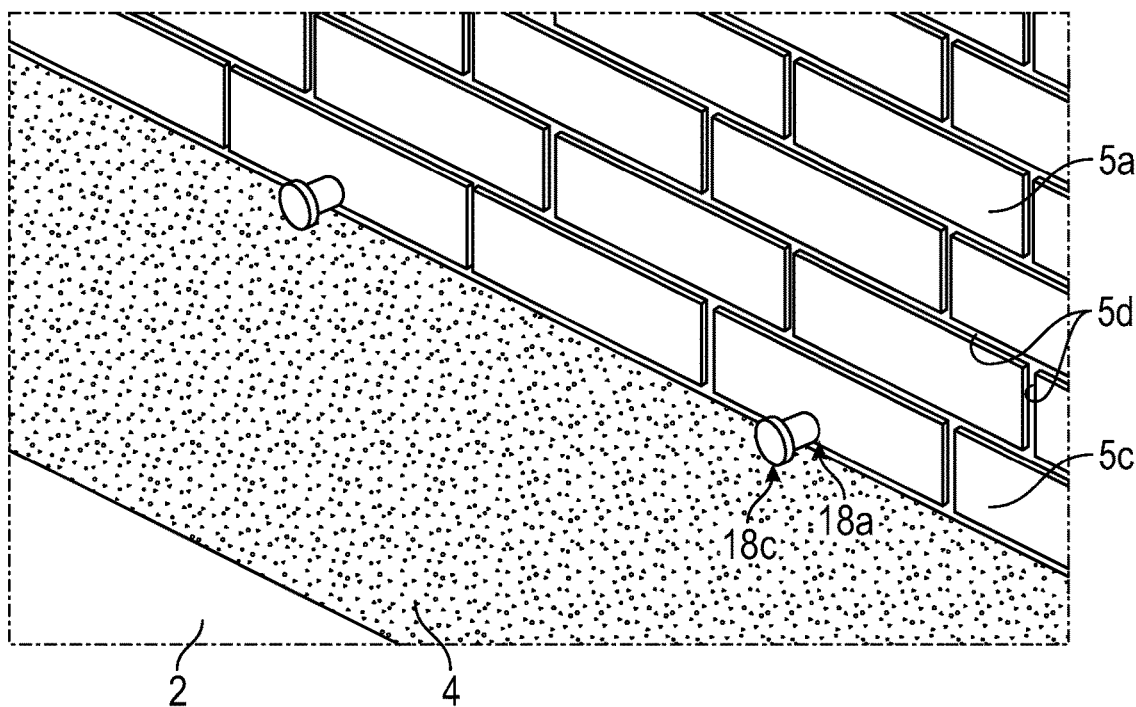
FIG. 4 is another perspective view of the home in FIG. 1 illustrating newly formed weep holes with weep hole plugs installed.

As illustrated in FIGS. 3 and 4, new weep holes 18a are then constructed by drilling or coring approximately 1" diameter holes through the brick-veneer wall 5a and into the ventilation cavity 5e located between the exterior wall 5a and the inner sheathing wall 5b immediately above the concrete foundation 4 (and optionally under windows which extend below the DFE 3). A high-speed drill and a diamond rotary coring bit configured with a depth control rod may be used for creating these new weep holes 18a. By design, the spacing of the new weep holes will be no more than 33" or the spacing specified in the local building code to ensure adequate inner wall ventilation. The new weep holes 18a will be visually inspected to ensure the new weep holes have a minimum of ¾" of effective sealing depth from the exterior face of the wall 5a. High-strength, epoxy-based grouting adhesive or other suitable chemical product may be applied on an as needed basis to fill any imperfections in the first ¾" of the new weep holes 18a. In these cases, the chemical filler product is allowed to fully cure before using a 1" diameter drill or grinder bit to ensure the bore of weep holes 18a are smooth. Removable, cylindrically-shaped weep hole screen inserts 18d made from a weave of coarse-cut alloy metal fibers or other suitable material are then installed deep within the new weep holes 18a adjacent to the ventilation cavity 5e. During normal weather conditions, the system provides ventilation of the exterior wall cavity 5e and prevents rodents, reptiles, large insects and embers or flames from entering the house through the weep holes 18a. Immediately preceding a flood event, weep holes 18a may be quickly sealed by deploying removable, weep hole sealing plugs 18c which are made from semi-malleable synthetic plastic cork or other suitable material. Plugs 18c are approximately 1¼" long with a tapered profile of approximately ⅞" to 1⅛" in diameter and have an integral T-shaped head to facilitate easy removal after the flood waters recede. Weep holes 18a may be quickly sealed immediately preceding a flood event and in inclement weather conditions by deploying plugs 18c into the holes 18a using simple tamping action with a rubber mallet or other suitable tool.

Figure 5:
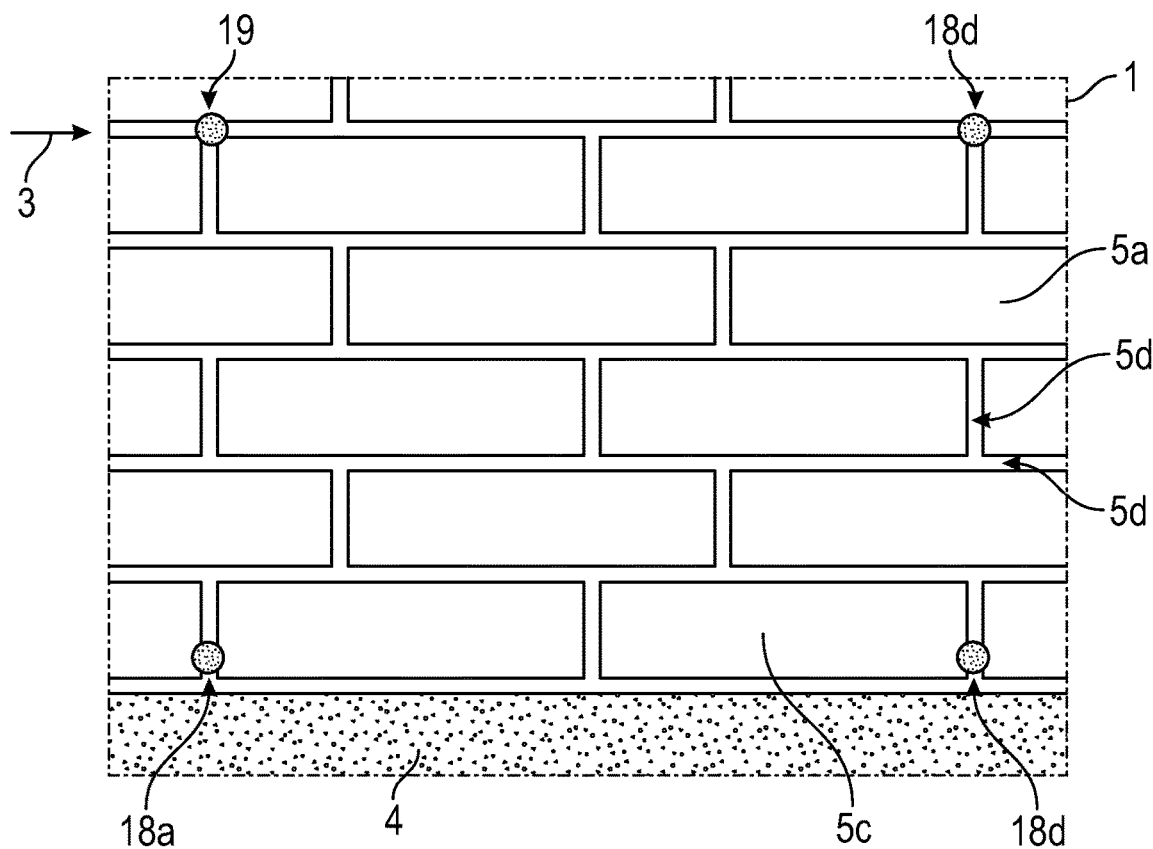
FIG. 5 is an elevation view of the home in FIG. 1 illustrating newly formed weep holes and drain holes with screen inserts installed.
Figure 6:
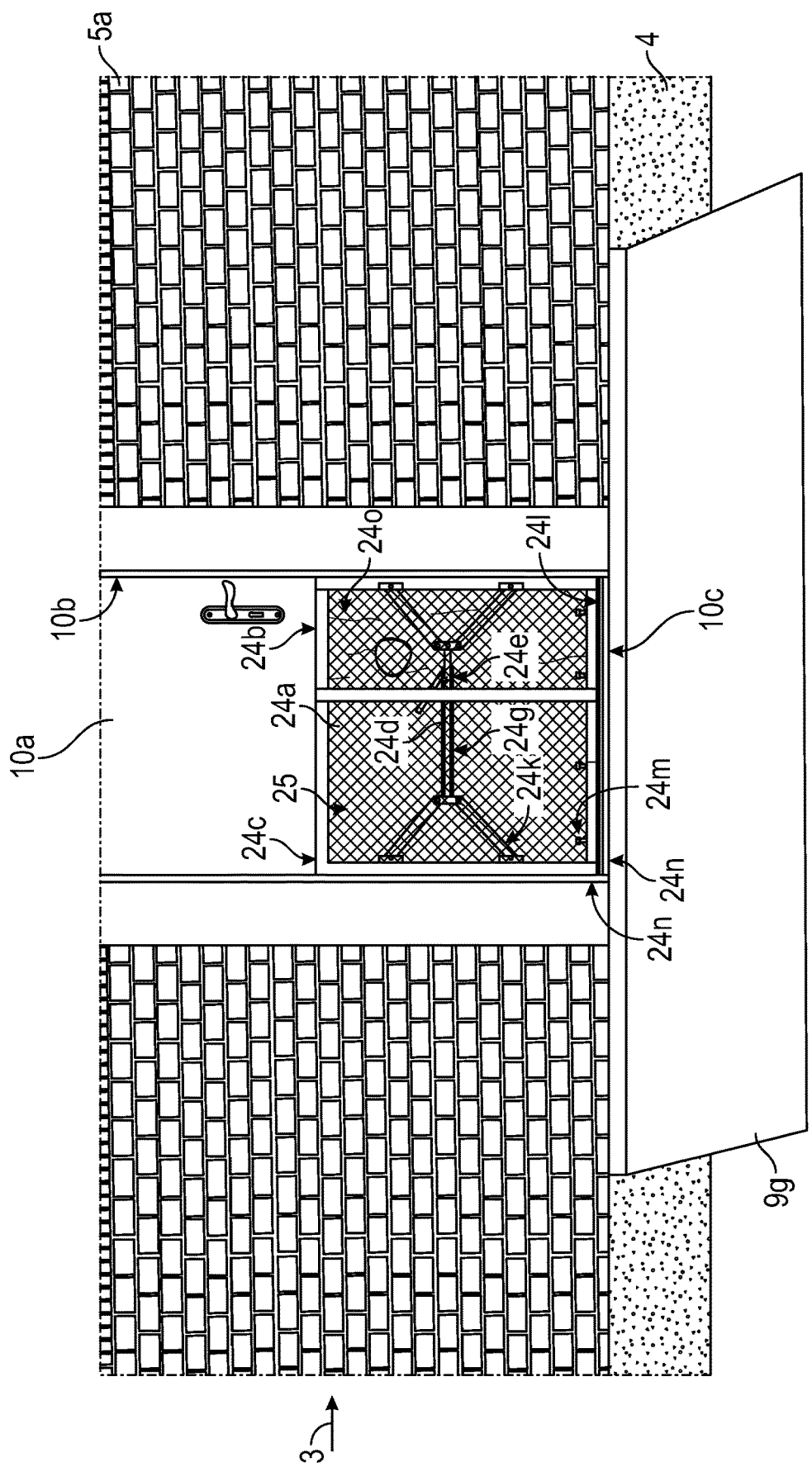
FIG. 6 is an elevation view of the home in FIG. 1 illustrating a re-deployable protector assembly for a door.
Figure 7:
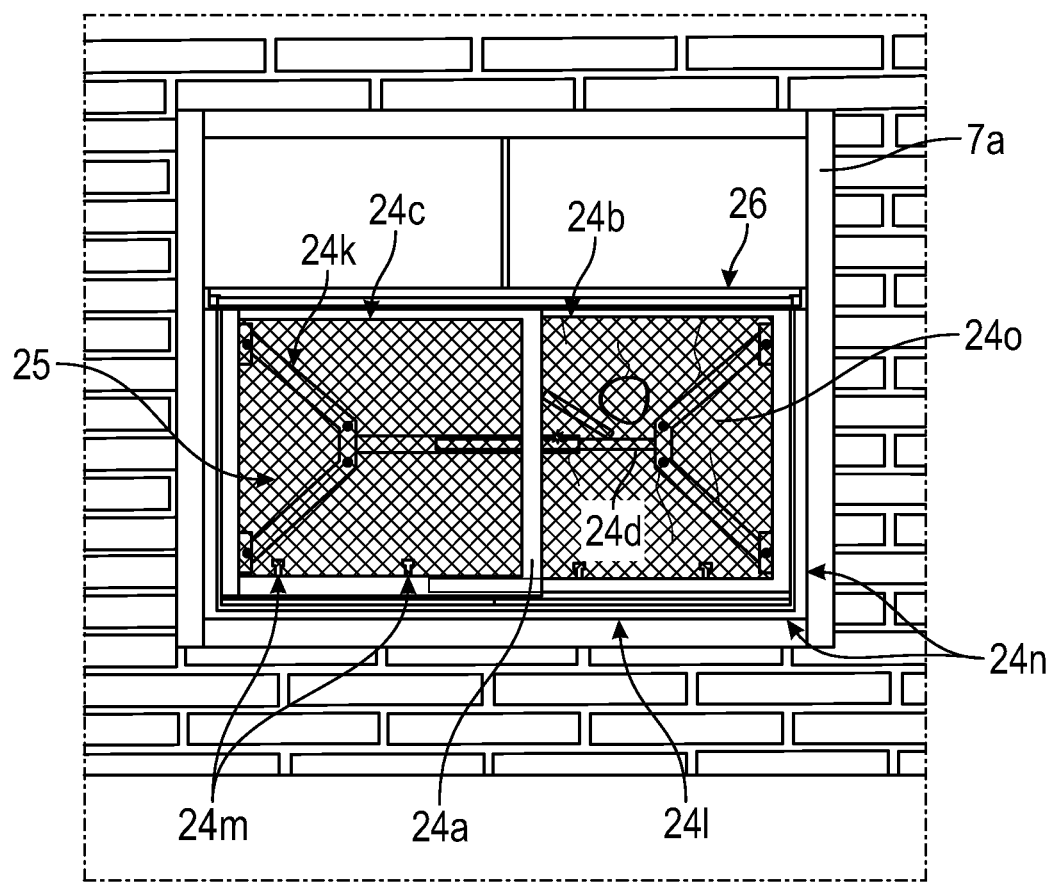
FIG. 7 is an elevation view of the home in FIG. 1 illustrating a re-deployable protector assembly for a recessed window.

Referring now to FIG. 5, which is an elevation view of exterior wall 5a of building 1, illustrates how the dry flood proofing solution of the present disclosure is designed to ensure excessive collapse and buoyancy forces do not compromise the structural integrity of the building 1 should flooding exceed the DFE 3 of 24" above the top of the concrete foundation 4. A series of approximately 1" diameter drain holes 19 spaced along the sides of building 1 at unobtrusive locations are drilled through the masonry wall 5a and into the ventilation cavity 5e at or near the DFE 3 using a core drill, hammer drill and masonry bit or other suitable boring equipment with depth control rod to prevent penetration into the inner sheathing wall 5b. The orientation of the drain holes 19 at the DFE 3 will be inclined slightly upward to prevent wind-driven rain from entering the ventilation cavity 5e between the exterior masonry wall 5a and the inner sheathing wall 5b. Should flood waters exceed the DFE 3, water will enter the building 1 through the drain holes 19 preventing the collapse of exterior wall 5a and damage to the building foundation 4 from buoyancy effects. The drain holes 19 also are used to improve ventilation of annular space 5e between the exterior masonry wall 5a and the inner sheathing wall 5b. Screen inserts 18d are also inserted into drain holes 19 to prevent pests from entering the house through the drain holes 19. These DFE level drain holes may be temporarily plugged, if required, utilizing the weep hole plugs 18c (i.e. pressure washing house, painting or sealing brick, ambient smoke event, blizzard winds, etc.).

The final step in the pre-flood prep process for configuring the Pluggable Weep Hole System includes applying one or more coats of a suitable chemical sealant product to the exposed brick, rock, mortar, and concrete of exterior walls 5a and concrete foundation 4 using a spray gun, brush or other suitable application technique in a manner which leaves minimal visual impact on the appearance of the building 1 in order to waterproof the walls 5a and exposed foundation 4 from GLE 2 to the DFE 3. Ideally, the chemical sealant is fully transparent and will not leave a sheen after fully curing.

It is recommended to inspect the pluggable weep holes 18a on an annual basis to ensure the sealing surfaces are clean and the screen inserts 18d are in good working condition. Plugged or damaged screens 18d may be removed using a simple J-hook device or simply punching them through the end of the weep holes 18a or drain holes 19 where they will rest in the annular cavity 5e located behind the exterior wall 5a. Additionally, it is recommended that the exterior walls 5a and the concrete foundation 4 from GLE 2 to the DFE 3 should also be inspected at least annually and any defects found should be repaired. Finally, it may be necessary to reapply the chemical sealant to the exposed brick, rock, mortar, and concrete of exterior walls 5a and concrete foundation 4 from GLE 2 to the DFE 3 as required to ensure the long-term effectiveness of the waterproof seal.

Door and Window Protector System:

Door and window protectors are custom-fitted assemblies that can be deployed in just minutes immediately preceding a flood event to effectively seal and protect exterior doors and low-lying recessed windows from standing water levels up to the DFE. After confirming the fit during pre-flood prep, each reusable assembly is labeled and stored along with the other deployable components of the present dry flood proofing solution to facilitate emergency deployment by the building owner or tenant immediately preceding a possible flood event. These protector assemblies do not require special pre-fabrication or modifications to door or window frames, however annual inspections of these areas of the building are recommended to ensure they (a) have been effectively sealed with waterproof caulking material and (b) can support the protectors along with the forces imposed by a column of water from the base of the doors and/or windows to the DFE and hydrodynamic forces including the impact of floating debris after deployment. Door and/or window screens may need to be removed prior to emergency deployment of the protectors. Protectors are designed to be expandable should be available in a variety of standard size ranges (e.g. 12" and 24" height; 18"-32", 32"-46", 46"-60" and 60"-74" width) to accommodate different door and recessed window configurations. For inward-opening doors, deployed protectors do not prevent the door from being opened in the presence of flood waters up to the DFE to facilitate home ingress and egress during the flooding event.

Referring now to FIGS. 6-9, a re-deployable door and window protector assembly 24a is illustrated and includes the integration of several components and deployment techniques. The height of each protector assembly 24a is designed to extend from the base of an exterior door 10a or recessed windows 7a to at least the DFE 3.

Each protector assembly 24a is comprised of an approximately ½" aluminum or PVC hard plastic square tube male frame 24b, which telescopes into an approximate ¾" aluminum or PVC hard plastic square tube female frame 24c to enable expansion during deployment using a ratchet strap apparatus 24d. Each ratchet strap apparatus 24d includes a lever-actuated ratchet strap tightening device 24e, strap 24f, concentric square tube expansion bar 24g (approximately ¾" female 24h by ½" female 24i), ratchet strap spindle 24j, dual square tube (approximately ½") V-arms 24k, which are attached to female frame 24c, and adjustable male frame 24b of protector assembly 24a. Strap 24f runs from tightening device 24e along the outside of the outer female square tube 24h of expansion bar 24g in a direction away from tightening device 24e, around spindle 24j, and back along the inside of the female square tube 24h of expansion bar 24g toward tightening device 24e, and is anchored at the end of the inner male square tube 24i of expansion bar 24g to enable expansion and contraction of expansion bar 24g by actuating tightening device 24e. The main structural components of ratchet strap apparatus 24d are made from aluminum or other suitable materials. Ratchet strap tightening device 24e employs a tension-limiter to ensure all components of each protector 24a and the frame and jambs 10b of exterior doors 10a and frame, jambs, and casings 7b of recessed windows 7a are not damaged due to over extension of the protector assembly 24a.

Dual integral rigid plastic lattice-work panels 25 are deployed within rails located on the flood-side of the frames 24b, 24c of each protector assembly 24a to facilitate expansion and contraction of frames 24b, 24c. Panels 25 are designed to provide structural support for an approximately ¹⁄₁₆" thick neoprene or similar elastic waterproof fabric sleeve 24o (shown with transparency), which encases the flood-side of each protector assembly 24a. Prior to deployment of each protector assembly 24a adjacent to doors 10a and/or window 7a, the design requires temporary placement of approximately ¾" wide by ⁵⁄₁₆" thick dense closed-cell foam gasket material 24n along the inside edges of frames, jambs, sills, and threshold 10b, 10c of doors 10a and/or the frames, jambs, sills, and casings 7b, 7c of recessed windows 7a or optionally along the left and right side termination of wall 5a adjacent to doors 10a and/or recessed windows 7a. Foam gaskets 24n provide an effective seal between each protector assembly 24a and the doors 10a and/or recessed windows 7a.

With the exterior doors 10a and/or recessed windows 7a temporarily in an open position, the design of the open-back sleeve 24o provides access to the lever-actuated ratchet strap device 24e for forcefully expand V-arms 24k of ratchet strap apparatus 24d along with the male frame 24b and female frame 24c of each protector assembly 24a. During emergency deployment immediately preceding a flood event, actuation of the ratchet strap apparatus 24d causes the male frame 24b and female frame 24c of each protector assembly 24a to compress gasket 24n which creates an effective seal between the waterproof sleeve 24o of protector assembly 24a and the inside edges of frames and jambs 10b of doors 10a and frames, jambs, and/or casings 7b of recessed windows 7a or optionally along the left and right side termination of wall 5a adjacent to doors 10a and/or recessed windows 7a.

An adjustable plate 24l is provided along the bottom of each protector assembly 24a, which can be easily adjusted downward using approximately four small bolts 24m to compress the bottom gasket seal 24n at the door thresholds 10c and/or window sills 7c after expanding the protector assembly 24a laterally to compress gasket 24n along the sides of doors 10a and/or recessed windows 7a. The open-back design of sleeve 24o also allows access to tighten bolts 24m from behind protector assembly 24a when the exterior doors 10a and/or recessed windows 7a are temporarily in an open position to facilitate deployment.

All-weather tape 26, designed to adhere to glass or other surfaces in either dry or wet conditions, is used to seal the top of the expandable waterproof sleeve 24o of each protector assembly 24a, which is deployed to protect recessed windows 7a. The top of the sleeve 24o is configured with slick-sided expandable material, which is optimized for use with the all-weather tape 26.

Wall Appurtenance Protection System:

The Wall Appurtenance Protection System includes a variety of molded covers, gaskets, fasteners and other materials for sealing electrical outlets, vents, HVAC/plumbing, and other wall penetrations located below the DFE while providing needed ventilation of exhaust vents above DFE via hooded snorkels.

Figure 10:
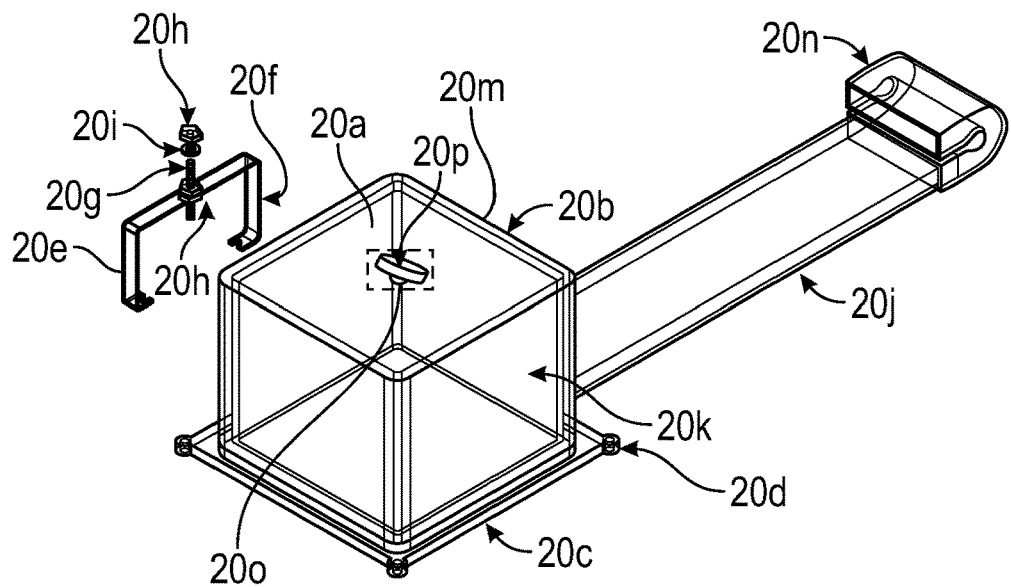
FIG. 10 is a perspective view of a cover used for protecting wall receptacles and vents during a flood.
Figure 11:
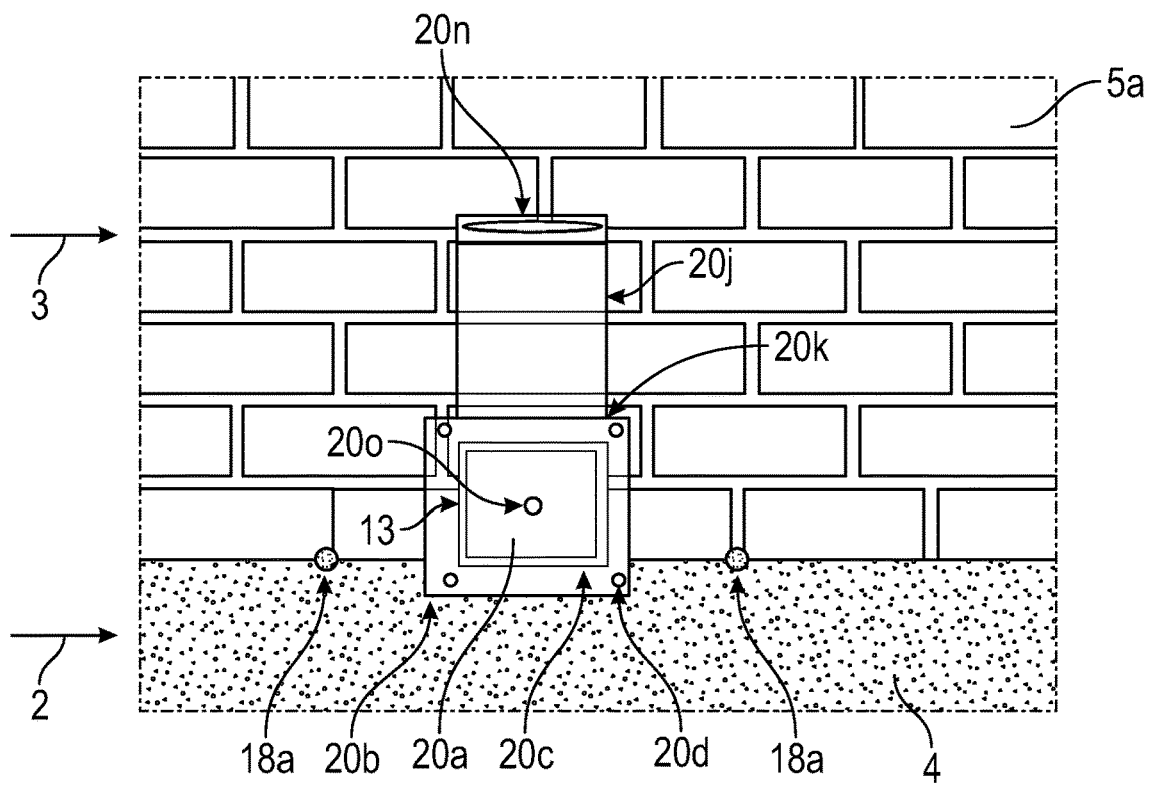
FIG. 11 is an elevation view of the home in FIG. 2 illustrating the cover in FIG. for a vent.
Figure 12:
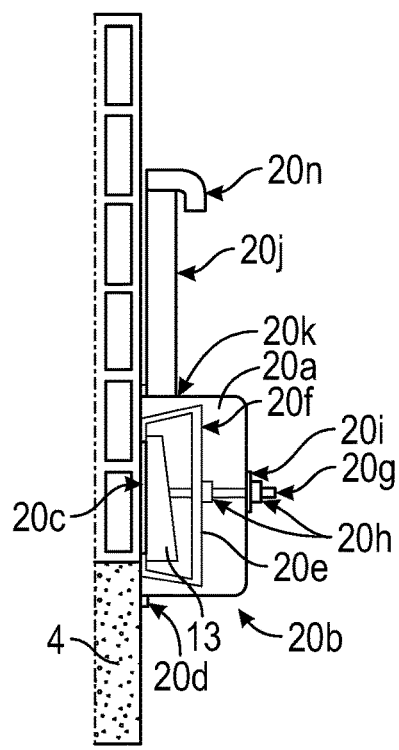
FIG. 12 is a side view of the cover in FIG. 11.

FIGS. 10-12 illustrate wall receptacle and vent cover apparatus 20a for sealing and isolating electrical outlets and other penetrations 14 located below the DFE 3 and protecting exhaust vents 13 while maintaining an air exhaust vent at the DFE 3. Flanged dome-shaped plastic housing 20b is sized to completely encase exhaust vent 13 or electrical outlet and other wall penetrations 14 protruding from the exterior wall 5a below the DFE 3 and are manufactured with four ⁵⁄₁₆" diameter mounting holes 20d to receive optional ¼" screw or bolt in pre-set anchor fasteners. Approximately ½" thick by 1" wide closed-cell foam gaskets 20c are placed between the housing 20b and the exterior wall 5a during deployment to create a water proof seal after deployment of cover apparatus 20a. The housing 20b may be deployed immediately preceding the flood event using (a) spring steel "caliber-style" fasteners 20e with an integral ¼" stud 20g inserted through a ⁵⁄₁₆" hole 20o in the center of housing 20b, (b) ¼" screws, or (c) ¼" bolts into pre-installed threaded anchors at each corner of the vent outlet 13 or other wall penetration 14 using housing 20b as template during pre-flood prep. An optional snap-in snorkel riser 20j having dimensions of approximately 1" depth by 5" to 7" wide by 36" tall and an O-ring seal 20m at its lower end may be snapped into fitting 20k of housing 20b when protecting exhaust vents 13. Prior to deployment of riser 20j, the removable cover of fitting 20k is removed. After deployment, the tube of snorkel riser 20j communicates the hooded vent 20n at the top of snorkel riser 20j located approximately at the DFE 3 with the convex housing 20b on its lower end. The top of riser 20j may be cut shorter to accommodate the specific DFE requirement. The hooded vent 20n is designed to slide over the top of the snorkel riser 20j to provide a leak point into the building 1 to mitigate risk of wall collapse should flood water rise above DFE 3; the hood 20n at the top of the snorkel riser 20j is designed to prevent rain from entering into snorkel riser 20j and housing 20b. If screw fasteners will be used for emergency deployment, four ³⁄₁₆" diameter holes may be pre-drilled into exterior wall 5a or concrete foundation 4 using the mounting holes 20d in housing 20*b* as a template during the pre-flood prep, then filled with colored wax for protection and camouflage. If the cover 20*a* is deployed using the spring steel "caliber-style" fasteners 20*e*, snap-in plug 20*p* will be removed from the ⁵⁄₁₆" hole 20*o* located in the center of housing 20*b*. To facilitate deployment of fasteners 20*e*, it may be necessary to use a Dremel®-like tool to create approximately ¾" slots on two opposite sides of the vent 13 or other outlet 14 to be protected to enable placement of the integral steel anchor claws 20*f* between opposite sides of the vent 13 or other outlet 14 and the wall 5*a*. An inner ¼" nut 20*h* may then be screwed onto stud 20*g* to tighten down and secure the "caliper-style" fasteners 20*e* before the housing 20*b* is attached. The housing 20*b* is tightened down to compress the foam gasket 20*c* using an outer ¼" nut 20*h* and sealing washer 20*i* on the stud 20*g*.

Figure 13:
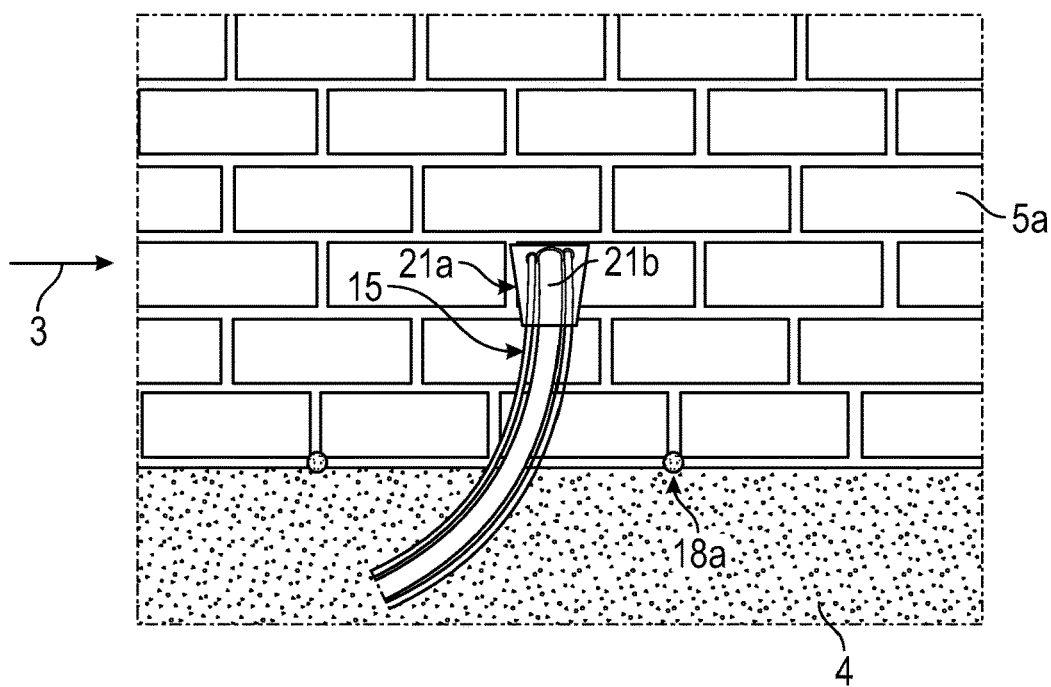
FIG. 13 is an elevation view of the home in FIG. 2 illustrating a system for sealing electrical and plumbing appurtenances.

FIG. 13 illustrates a system for sealing electrical and plumbing appurtenances 15 with a wall penetration located below the DFE 3. During pre-flood prep, plastic wrap-around cone 21*a* is installed by wrapping the cone 21*a* around appurtenances 15 immediately adjacent to exterior wall 5*a* when electrical and/or plumbing appurtenances 15 penetrate wall 5*a*. UV-protected spray-on foam water proof sealant 21*b*, which is capable of adhering to the rough surface of cone 21*a* and the surface of wall 5*a*, is then applied to completely fill cone 21*a* to create an effective water-proof seal around appurtenances 15 at the penetration with wall 5*a*.

Sewage Anti-Backflow System:

The Sewage Anti-Backflow System includes plugs deployed through toilet trapways to a location just below the wax ring, weighted seals for shower/other drains, and filling bathtubs with water to prevent ground floor sewage backflow during flooding conditions up to the DFE.

Figure 14:
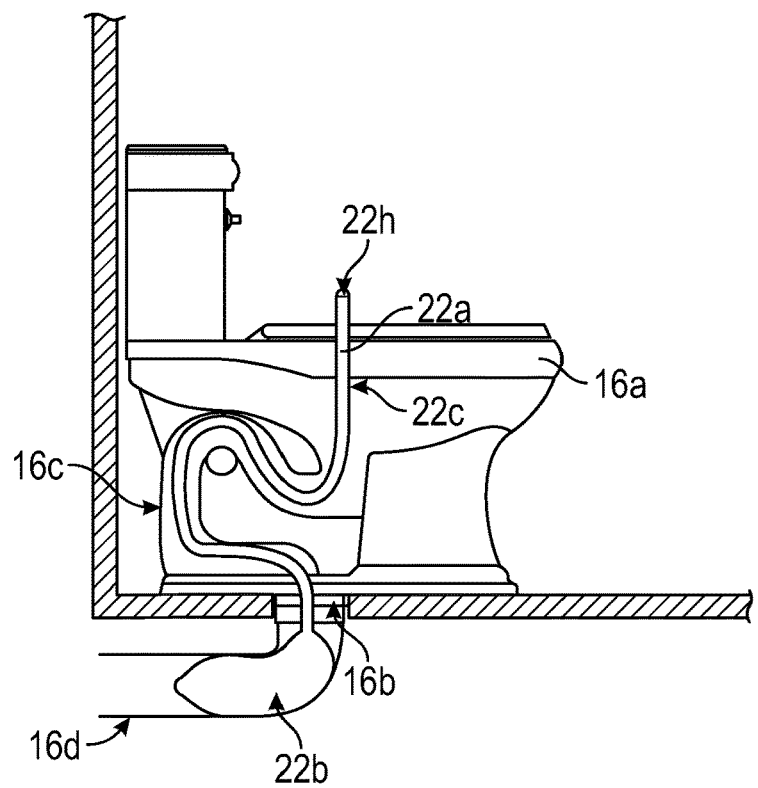
FIG. 14 is an elevation view of a device used for sealing a toilet during a flood.
Figure 15:
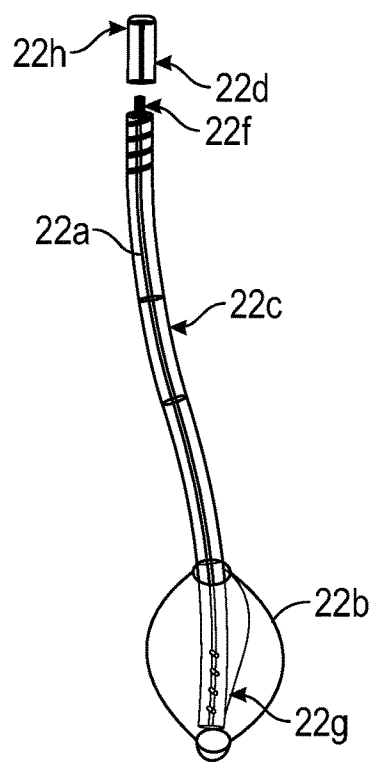
FIG. 15 is an elevation view of the toilet sealing device in FIG. 14.

FIGS. 14-15 illustrate a device for sealing the trapways 16*c* of toilets 16*a* located on the first floor of the building 1 at a location below the wax seal ring 16*b* at the lower end of toilet 16*a* immediately preceding an impending flood event. The air-inflatable bladder-type elastomer toilet plug 22*a* is designed to facilitate fast deployment through the toilet trapway 16*c* of toilet 16*a* to a location just below the wax ring 16*b* during an impending flood event. A Schrader valve assembly 22*f* is located at the upper end of the approximately ¾" diameter flex tube 22*c* for inflating and deflating the bladder 22*b*. The approximately 1¼" diameter bladder 22*b* in a deflated state will be pushed into and through the trapway 16*c*, then seated at a location immediately below wax ring 16*b* within the PVC sewage pipe 16*d* connected at the lower end of toilet 16*a*. The bladder 22*b* will then be inflated to approximately 10 psi using any suitable hand air pump with a pressure regulator to anchor and seal within PVC sewage pipe 16*d*. The toilet plugs 22*a* are designed to prevent sewage backflow through ground floor toilets 16*a* during flooding conditions. Toilet plug 22*a* can be easily removed by deflating bladder 22*b* using valve assembly 22*f* and pulling on the flex tube 22*c*.

Figure 16:
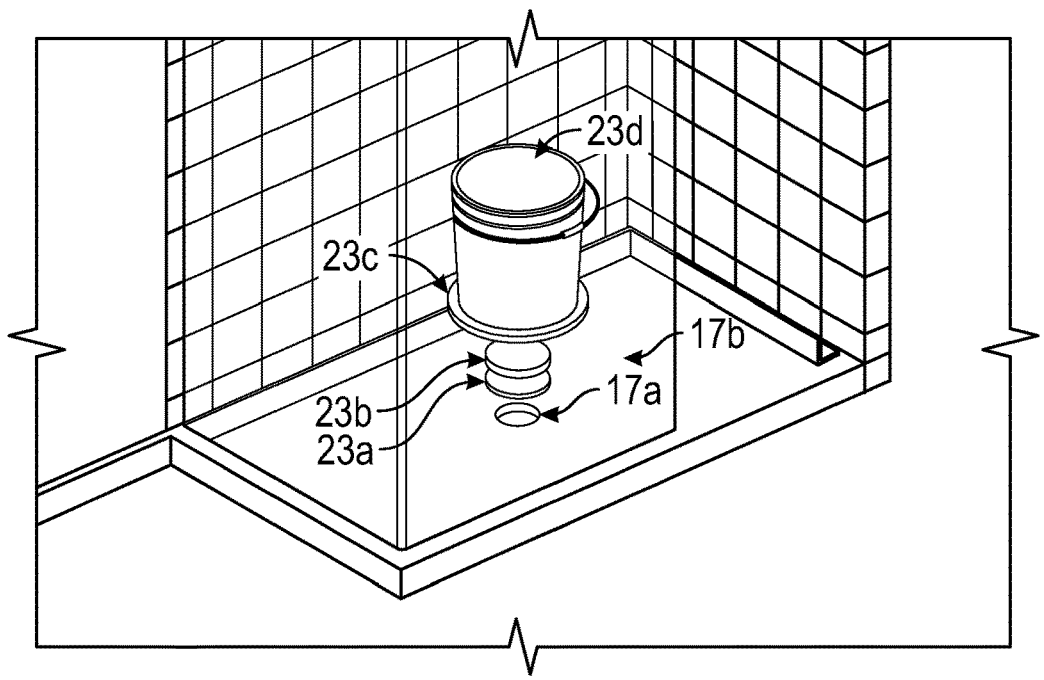
FIG. 16 is a perspective view of a system for sealing a shower drain during a flood.
Figure 17:
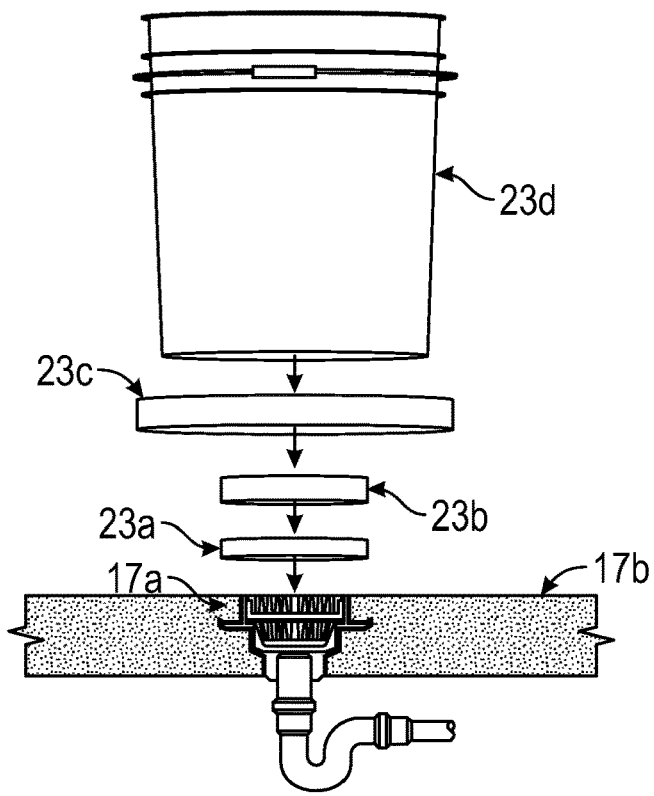
FIG. 17 is an exploded view of the shower drain sealing system in FIG. 16.

FIGS. 16-17 illustrate a system for preventing flood waters from causing sewage backup into approximately 3 to 4" diameter shower and/or floor drains 17*a* generally located at the lowest point of a gently sloping tile or other flooring substrate 17*b* on ground level in the building 1. An approximately 6" diameter by ½" thick waterproof, closed cell foam gasket 23*a* is used to effectively seal each of the drains 17*a* to prevent sewage backup caused by flood waters reaching the DFE 3 of approximately 24" of standing water. The emergency deployment process includes first centering gasket 23*a* over drain 17*a*, then placing an approximately 6" diameter by 1" thick hard solid plastic disk 23*b* directly over gasket 23*a*, then centering an approximately 12" diameter rigid plastic flat support structure 23*c* (e.g. the lid of a 5 gallon bucket) over disk 23*b*, then applying a minimum of 40 pounds of weighting material such as a water-filled 5 gallon bucket 23*d* or sand bags on top of the support structure 23*c*. The hydrostatic pressure from a 24" column of standing water is approximately 0.866 pounds per square inch, which will apply a potential upward force against the 6" diameter hard plastic cap 23*b* (28 sq. inches) of approximately 24 pounds, thus the recommended minimum weight of 40 pounds applied to disk 23*b* and underlying gasket 23*a* will be sufficient to ensure gasket 23*a* maintains an effective seal over drain 17*a*.

Ground floor bathtubs will be protected by plugging the drain and filling the bathtub with water to overflow vent and optionally placing a sand bag on top of plug if more weight is needed to address 24" DFE requirement (not shown).

House Wrap System:

The House Wrap System is a highly configurable, integrated solution for protecting exterior walls, doors, and windows to the DFE using pre-fitted, scrim-reinforced polyethylene sheeting (or similar waterproof sheeting material) and debris barrier netting, which are deployed immediately preceding a flood. Other solution components include plastic zipper technology, spring-loaded bars, gaskets, spacer blocks, and fastening apparatus. This system is uniquely designed to protect low-lying bay windows, garage door areas, and exterior walls, which are not constructed using brick or masonry veneer, but may also be used as an alternative method to protect recessed windows and exterior doors and/or for redundant protections when used along with the other systems described herein. Poly-wrap sheeting panel should always be secured in the vertical and horizontal positions with some "slack" to allow conformance to the house structure when hydrodynamic forces are applied in order to minimize stress on appurtenances around the building, poly-wrap sheeting panels, and other House Wrap System components.

Figure 18:
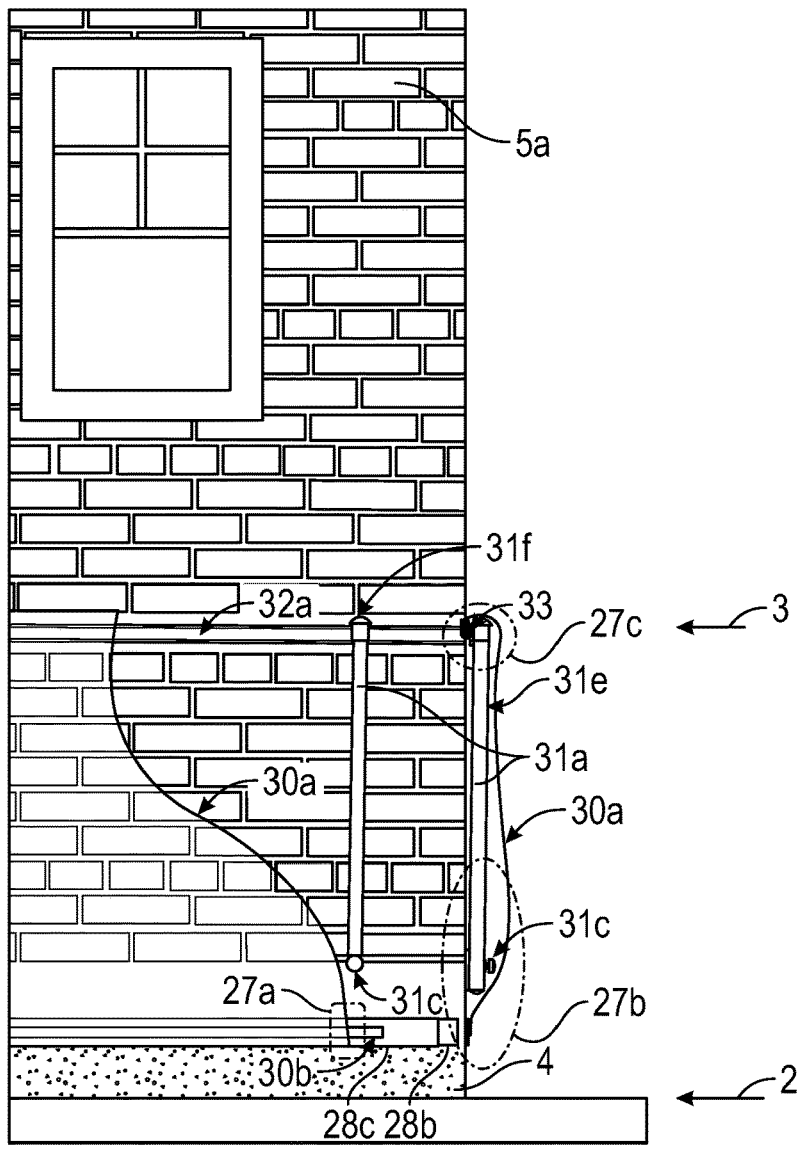
FIG. 18 is an elevation view of the home in FIG. 1 illustrating a house wrap system.

FIG. 18 illustrates the basic House Wrap System. A poly-wrap sheeting panel 30*a* is manufactured in continuous rolls from clear, laminated, reinforced film made of a dual layer of vapor-proof linear low-density polyethylene (LLDPE) with an inner layer of polyester string reinforcement scrim to increase puncture and tear resistance or another suitable waterproof sheeting material. If LLDPE sheeting material is used, the recommended sheeting thickness of sheeting panel 30*a* is approximately 10 mils to mitigate the risk of wind and puncture damage. The sheeting panel 30*a* will be manufactured in various widths (e.g. 24", 30", 36", and 46") to facilitate custom configuration and fitting during pre-flood prep.

Figure 19:
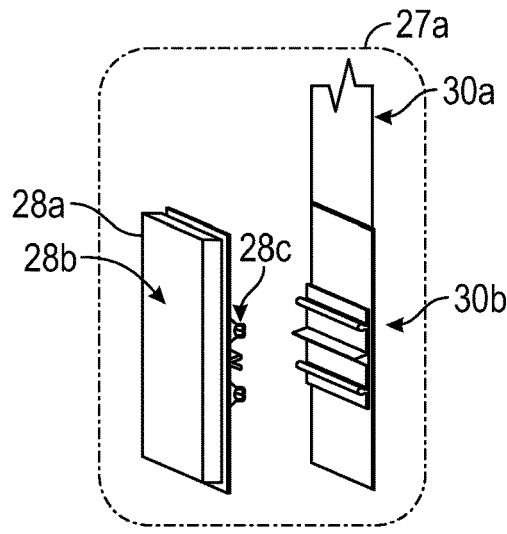
FIG. 19 is an expanded view of the area 27*a* in FIG. 18 illustrating panels and zipper strips used in the house wrap system.

FIG. 19 illustrates a perspective view of an integral dual male plastic zipper connection 30*b* provided along the lower edge of panels 30*a* in order to mate with the dual female zipper connections 28*c* hosted on zipper strips 28*a*, which are anchored and sealed to the side of the concrete building foundation 4 above, but in close proximity to GLE 2 during pre-flood prep. The first tongue and groove connector of dual female zipper connection 28*c* and dual male zipper connection 30*b* is optimized for creating an effective water tight seal using a relatively soft, more malleable plastic tongue n' grove connection (e.g. Ziploc®). The second connector of dual female zipper connection 28*c* and dual male zipper connection 30*b* is optimized for creating a higher tensile strength anchor using a harder, less pliable plastic. The purpose of this plastic zipper technology is to secure and seal the bottom of the sheeting panel 30a to the side of the concrete building foundation 4.

During the pre-flood prep process in dry weather conditions, approximately 1" wide zipper strips 28a, also made from LLDPE plastic or other suitable base sheeting material, are permanently installed in a continuous horizontal orientation onto the exposed sides of the exposed concrete building foundation 4 near GLE 2 using butyl tape 28b or similar adhesive that is waterproof, strong, flexible, and tolerant of rugose surfaces. After installation, butyl tape 28b is waterproof, weather resistant, and can be completely submerged without losing adhesion to concrete. Zipper strips 28a are manufactured in bulk rolls with integral dual female plastic zipper connections 28c to facilitate anchoring and sealing with the dual male zipper connections 30b of panels 30a during emergency deployment. Butyl tape 28b may be manufactured as an integral component of the zipper strips 28a on the side opposite to the female zipper connections 28c or alternatively may be packaged separately in rolls with a protective wax strip to facilitate installation onto the zipper strips 28a around the exposed side of building foundation 4 during pre-flood prep. During installation, zipper strips 28a and butyl tape 28b may be cut-to fit using scissors to facilitate customized solutions to accommodate specific house wrap requirements. The butyl tape 28b used to install zipper strips 28a is designed to facilitate complete removal and replacement of zipper strips 28a after a service life of approximately 5 years. After installation, zipper strips 28a are protected from adverse environmental conditions (e.g. temperature, moisture, UV, inserts, rodents, and dirt) using camouflaged removable cover which incorporates dual male zipper connections (not shown).

Figure 20:
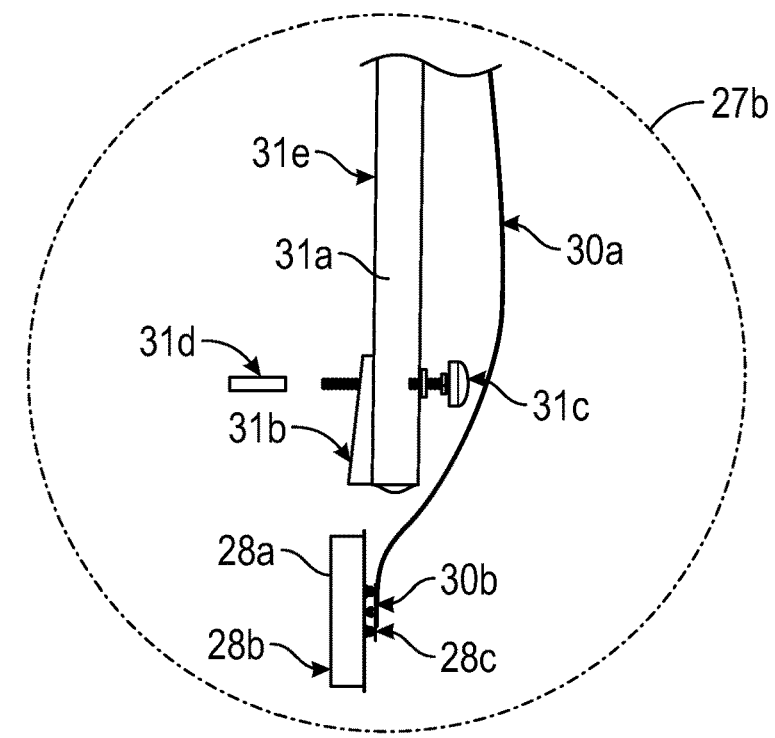
FIG. 20 is an expanded view of the area 27*b* in FIG. 18 illustrating a bottom section of a wall riser used in the house wrap system.
Figure 21:
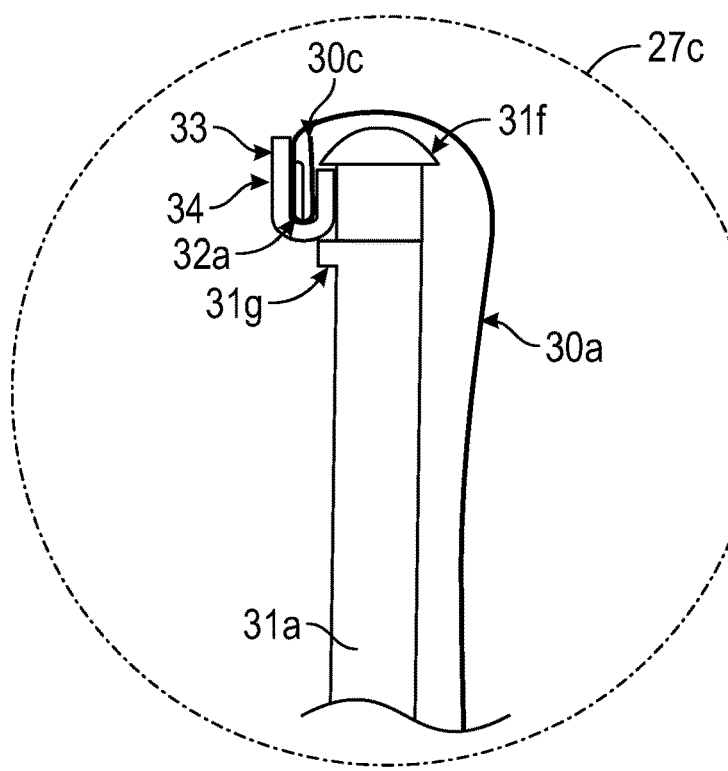
FIG. 21 is an expanded view of the area 27*c* in FIG. 18 illustrating a top section of a wall riser used in the house wrap system.

Referring now to FIGS. 20-23, a series of vertical wall risers 31a spaced laterally approximately every 4 feet along the base of the exterior walls 5a, 6a to be protected with the House Wrap System are used to provide vertical support for the poly-wrap panels 30a during emergency deployment immediately preceding an impending flood event. FIG. 20 illustrates a bottom cross section view of the integrated House Wrap System while FIG. 21 illustrates a top cross section view of the same system.

Each vertical wall riser 31a is manufactured with a ½" aluminum, PVC, or other hard plastic square tube riser 31e with a height sufficient to span the entire width of the sheeting panel 30a from the integral mounting flange 31b on its lower end to the rounded cap 31f at its upper end. The standard length of square tube riser 31e is approximately 28", but the top of the square tube riser 31e may be cut shorter during pre-flood prep as required before the rounded plastic riser cap 31f is slipped over top of riser to prevent damage to the poly-wrap sheeting panel 30a after emergency deployment.

Flange 31b is approximately ½" wide and 3" tall is canted at an angle from a vertical orientation using a tapered profile from approximately ½" at its bottom to ¼" at its top to provide force against the exterior wall 5a, 6a at the upper end of square tube riser 31e upon deployment. Each vertical wall riser 31a is deployed using a ¼" hex bolt 31c inserted through a 5/16" hole in the flange 31b at the lower end of the square tube riser 31e and screwed into a pre-set ¼" threaded masonry anchor 31d in the exposed side of the concrete building foundation 4 just below the bottom of exterior wall 5a, 6a or alternatively using a ¼" masonry screw fastener installed into a pre-drilled 3/16" hole in the side of the foundation 4. A rounded cap may be snapped onto the head of the bolt 31c after installation to protect the sheeting panel 30a from puncture damage or abrasion wear. To facilitate emergency deployment of vertical wall risers 31a, the ¼" threaded anchors 31d should be permanently installed at a spacing of approximately 4 feet into the exposed side of foundation 4 adjacent to exterior wall 5a, 6a during pre-flood prep. Similarly, if ¼" masonry screw fasteners will be used to deploy vertical wall risers 31a, the 3/16" holes should be drilled into the side of the foundation 4 during pre-flood prep.

Vertical wall risers 31a are used in conjunction with poly-wrap stiffeners 32a, which are inserted into the integral sleeve 30c provided at the top of the poly-wrap panel 30a, poly-wrap top seal foam gaskets 33, and top seal clips 34 to provide vertical support for sheeting panel 30a after deployment.

Poly-wrap stiffeners 32a are approximately ¾" wide by ⅛" thick solid rigid bar material made of PVC or other hard plastic to provide lateral support for sheeting panel 30a at its upper end during emergency deployment. Stiffeners 32a are manufactured to a standard length of approximately 8 feet and are cut-to-fit and labeled during pre-flood prep to ensure proper fit. Stiffeners 32a have a female coupler 32b on one end with inside dimensions of slightly larger than ¾" wide by ⅛" high by 1½" deep that facilitate connecting multiple bar sections to accommodate longer spans as required. The upper edge of sheeting panel 30a is manufactured with an integral approximately 1" wide plastic sleeve 30c to receive the poly-wrap stiffener bars 32a.

Top seal gaskets 33 are made from J-shaped closed-cell foam material (approximately 2" wide and ¼" thick) and are custom fitted to the required lengths of poly-wrap panels 30a and labeled during pre-flood prep to facilitate emergency deployment. An integral tab 31g is provided approximately 2" below the top of the square tube riser 31e along its inside edge to ensure proper positioning of top seal gasket 33 during deployment.

Top seal clips 34 are deployed along the top of sheeting panel 30a approximately midway between each vertical wall riser 31a to secure the top seal gasket 33 to the outside edge of sleeve 30c containing the stiffeners 32a at the top of the sheeting panel 30a before tucking the sleeve 30c, stiffeners 32a, and top seal gasket 33 behind the upper end of the vertical wall risers 31a to compress the top seal gasket 33 against wall 5a, 6a. Top seal clips 34 are made from spring steel or aluminum (approximately ¾" wide) and have a design similar to a garage door remote visor clip.

During deployment, one person holds the top of the sheeting panel 30a in place after first securing the male zipper connection 30b at the bottom of panel 30a into the female zipper connection 28c of the zipper strip 28a, inserting the stiffeners 32a into the sleeve 30c at the top of the panel 30a, and installing the top seal gasket 33 using the top seal clips 34 while a second person tucks the sleeve 30c, stiffener 32a, and top seal 33 behind the square tube riser 31e of each vertical wall riser 31a to anchor the sheeting panel 30a at its top end near the DFE 3. The compression force against the exterior wall 5a, 6a caused by tightening down the ¼" bolt or masonry screw used to install each vertical wall risers 31a creates sufficient force (elastic potential energy) at the top of each square tube riser 31e to maintain the vertical orientation of riser square tube 31e and compress the top seal gasket 33 thereby creating the needed water-resistant barrier at the top of the poly-wrap panels 30a adjacent to exterior wall 5a, 6a at the DFE 3 after deployment. The top seal gasket 33 is designed to repel the majority of rain water runoff down the side of the exterior wall 5a, 6a.

Spring bars 36a are used with spring bar foam gaskets 36c for anchoring and sealing poly-wrap sheeting panel 30a vertically against exterior walls 5a, 6a along the sides of the sheeting panel 30a and/or along the corners of exterior walls 5a, 6a to compartmentalize the house wrap solution (e.g. each run of exterior wall may be configured as a separate water proof compartment). The solid approximately 1" wide by 1/8" thick spring bars 36a are manufactured from spring steel or aluminum in a variety of standard lengths up to 12 feet long with an outward flexure. Spring bars 36a have an approximately 1/8" thick integral rubber gasket which is pre-adhered to the bottom side of the concave surface during the manufacturing process to effectively anchor the sheeting panel 30a between the spring bar 36a and spring bar foam gasket 36c. Spring bar foam gaskets 36c are comprised of approximately 1" wide by 3/8" thick closed-cell foam run the entire length of each spring bar 36a to enable the edge of sheeting panel 30a to be sandwiched between the exterior wall 5a, 6a and each spring bar 36a installed in a vertical orientation. Spring Bars 36a and spring bar foam gaskets 36c may be cut-to-fit specific building house wrap requirements and are custom fitted and labeled during pre-flood prep to facilitate emergency deployment.

When used for anchoring and sealing sheeting panel 30a in vertical orientations, spring bars 36a extend from approximately GLE 2 to the DFE 3 and are anchored at both ends, with either a) 1/4" hex bolts 36i screwed into pre-set threaded anchors 36h, or b) 1/4" masonry (or wood) fasteners screwed into pre-drilled 3/16" holes after inserting the sheeting material of panel 30a between the spring bar 36a and a spring bar foam gasket 36c. During deployment, one person holds spring bar foam gasket 36c and sheeting panel 30a in place while another person deploys the spring bar 36a using a cordless drill and bolt fasteners 36i (or screws) to compress the spring bar foam gasket 36c. Tightening the fasteners 36i will straighten the spring bar 36a while compressing the spring bar foam gasket 36c against exterior wall 5a, 6a, thus making a water tight seal.

Poly-wrap containers 35a are permanently mounted, vertically-oriented, low profile, sealed containers which may be optionally installed at unobtrusive locations along the side or corner of the building structure 1 to host up to two rolls of pre-fitted poly-wrap sheeting 30a in order to facilitate deployment of the house wrap system immediately preceding the flood event. The inside edge of the rolled plastic poly-wrap sheeting panel 30a is attached to the exterior wall 5a, 6a under the sealed container 35a using butyl tape 28b. The containers 35a may be manufactured from composite plastic material and are permanently installed to the exterior wall 5a, 6a from slightly above GLE 2 to the DFE 3 using masonry or wood screw fasteners. The containers 35a facilitate deployment of the sheeting panel 30a by first opening the sealed container door 35b by opening the compression fit latches 35d and rotating door 35b using hinges 35c, then unrolling the sheeting panel 30a against the exterior walls 5a, 6a from slightly above GLE 2 to DFE 3. When installed at the corner of walls 5a, 6a, two rolls of sheeting panel 30a may be hosted from a single container 35a having two sealed doors 35b to facilitate protection of adjacent walls 5a, 6a. For exterior walls 5a, 6a where the optional poly-wrap containers 35a are not used, the deployment process starts by anchoring and sealing the starting edge of poly-wrap sheeting panel 30a using a spring bar 36a with underlying spring bar foam gasket 36c to exterior wall 5a, 6a. After securing one end of the sheeting panel 30a, the roll of sheeting panel 30a may be unrolled along the length of the exterior wall 5a, 6a to be protected similar to the process that will be used if poly-wrap containers 35a are used to permanently store the roll of pre-fitted sheeting panel 30a on the side or corner of exterior walls 5a, 6a.

Figure 24:
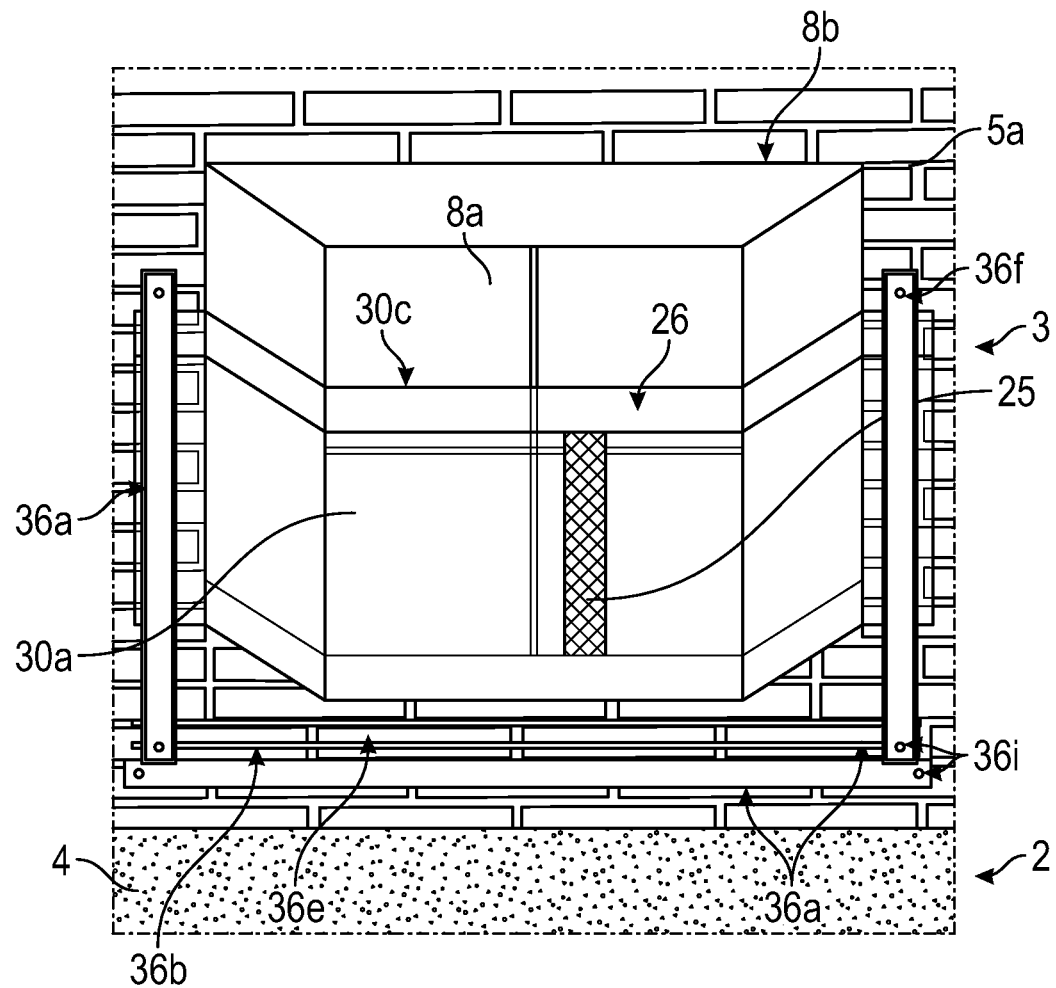
FIG. 24 is an elevation view of the home in FIG. 1 illustrating the house wrap system used to protect a low-lying bay window from flooding.

FIG. 24 illustrates the application of the House Wrap System to protect a bay window 8a, which extends below the DFE 3. During pre-flood prep, poly-wrap sheeting panels 30a are customized using an extrusion process to shape the sheeting material around the protruding area to be protected or alternatively using poly-plastic cut-outs, which have been heat/pressure sealed or taped to form a single waterproof panel fitted to the profile of the area to be protected. Fragile glass in each bay window 8a is protected from floating debris during flooding by using either rigid plastic lattice panels 25 or alternatively batting panels, which will have been previously custom-fitted to the area to be protected and labeled during pre-flood prep to facilitate deployment. Rigid plastic lattice panels 25 are made from hard plastic and may be cut-to-fit from their standard size of approximately 1/16" thick by 35" wide by 24" tall.

For masonry veneer walls 5a, horizontally-oriented spring bars 36a and spring bar zipper gaskets 36d may be used to seal the lower end of sheeting panels 30a. Spring bar zipper gaskets 36d are made by bonding together the following components: (a) approximately 1" wide by 3/8" thick closed-cell foam gasket material, (b) integral dual female zipper connection 36e mounted on an approximately 2" wide 10 mil polyethylene plastic tab, and (c) approximately 1" wide by 1/8" thick foam gasket. In this application, spring bar zipper gaskets 36d are deployed between the exterior wall 5a located immediately below the bay window 8a and the spring bar 36a during emergency deployment using a process similar to how spring bar gaskets 36c are deployed. Tightening down on the hex bolt fasteners 36i (or screws) inserted through the 5/16" hole 36f at each end of spring bar 36a, compresses the foam material contained within spring bar zipper gaskets 36d against exterior wall 5a and firmly anchors and seals the female zipper connections 36e, which will be used to mate with the male zipper connections 30b of the sheeting panels 30a. Alternatively, horizontal-oriented spring bars 36a and spring bar foam gaskets 36c may be used to seal the bottom of the poly-wrap sheeting panel 30a. Vertically-oriented spring bars 36a and spring bar foam gaskets 36c are used to seal the sides of the poly-wrap sheeting panel 30a. All weather tape 26, which may be applied in both dry and wet conditions, is used to seal the top of the sheeting panel 30a at the DFE 3.

Figure 25:
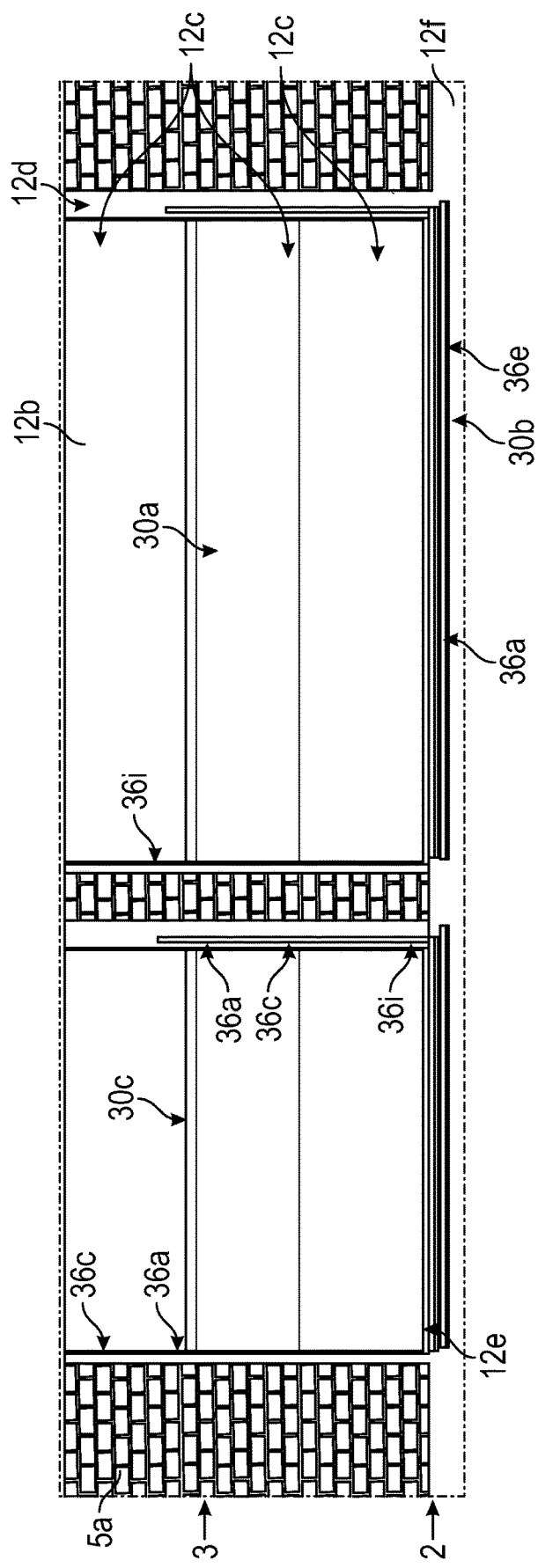
FIG. 25 is an elevation view of the home in FIG. 2 illustrating the house wrap system used to protect a sectional type garage door from flooding.

Referring now to FIG. 25, sectional type garage doors 12b adjacent to masonry veneer walls 5a with articulated horizontal door panels 12c may also be protected to a height at or above the DFE 3 using the integrated House Wrap System. For deployment of poly-wrap sheeting panels 30a of a suitable width (e.g. 36" or 46") across sectional-type garage doors 12b immediately preceding the flood event, the upper sleeve 30c of the sheeting panel 30a is simply tucked into the closest articulated joint of door panels 12c located above the DFE 3 prior to completely closing the garage door 12b. Upon fully closing garage door 12b, the upper end of sheeting panel 30a will be fully secured at a height slightly above the DFE 3. After securing the upper end of sheeting panel 30a, each side of sheeting panel 30a will be anchored and sealed within the frames 12d of garage door 12b using vertically-oriented spring bars 36a and spring bar foam gaskets 36c with suitable fasteners 36i. The bottom 12e of garage doors 12b are sealed to the driveway substrate 12f using horizontally-oriented spring bars 36a and spring bar zipper gaskets 36d with suitable fasteners 36i and mating the male zipper connections 30b of sheeting panels 30a with the female zipper connections 36e of the zipper gaskets 36d or alternatively using spring bar foam gaskets 36c to seal the sheeting panels 30a directly against the driveway substrate 12f. All components of the House Wrap System for protecting sectional type garage doors 12b should be configured and labeled during pre-flood prep to facilitate emergency deployment.

Figure 26:
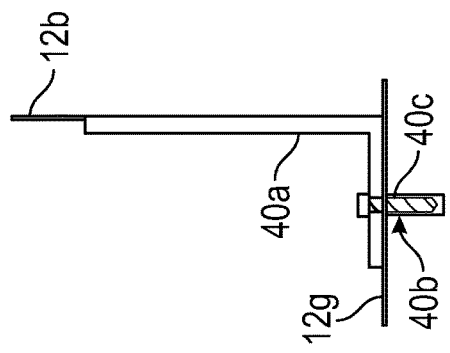
FIG. 26 is an elevation view of a garage door support strut used in the house wrap system to reinforce a garage door against forces from flood waters.
Figure 27:
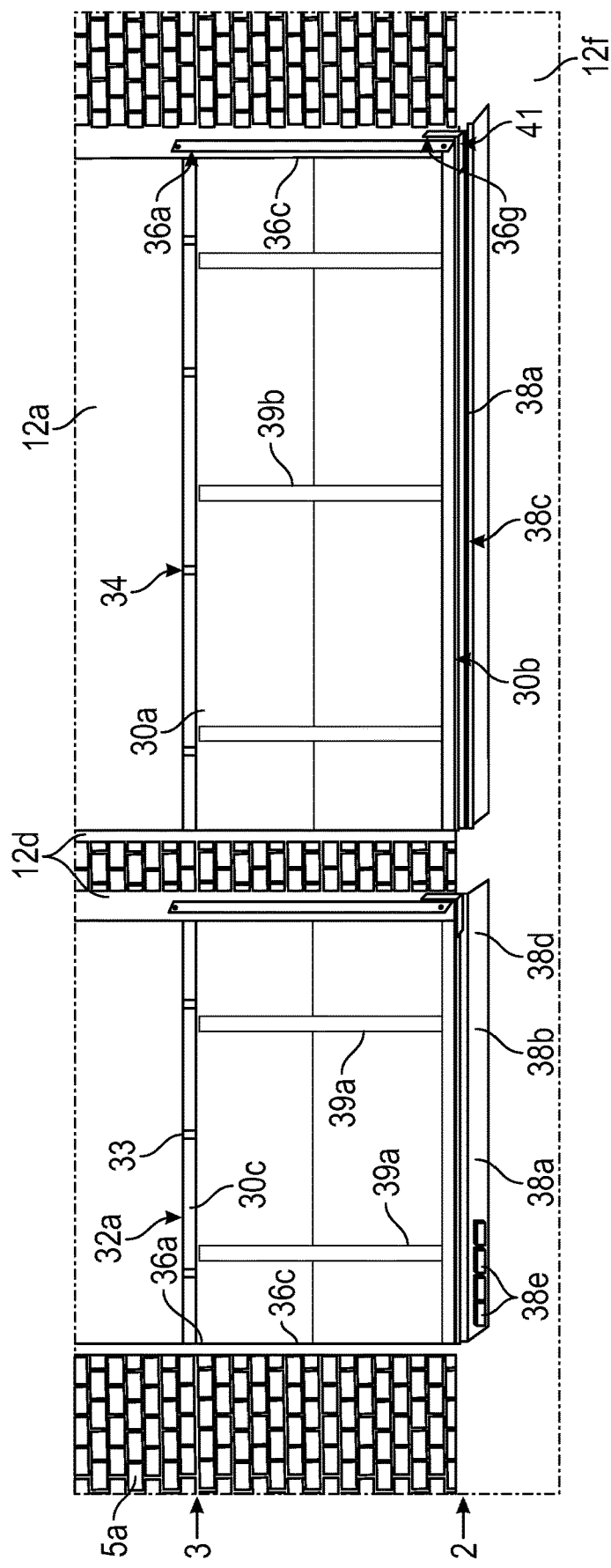
FIG. 27 is an elevation view of the home in FIG. 2 illustrating garage door risers, zipper mats, and other components used in the house wrap system to protect a non-sectional or solid type garage door from flooding.
Figure 28:
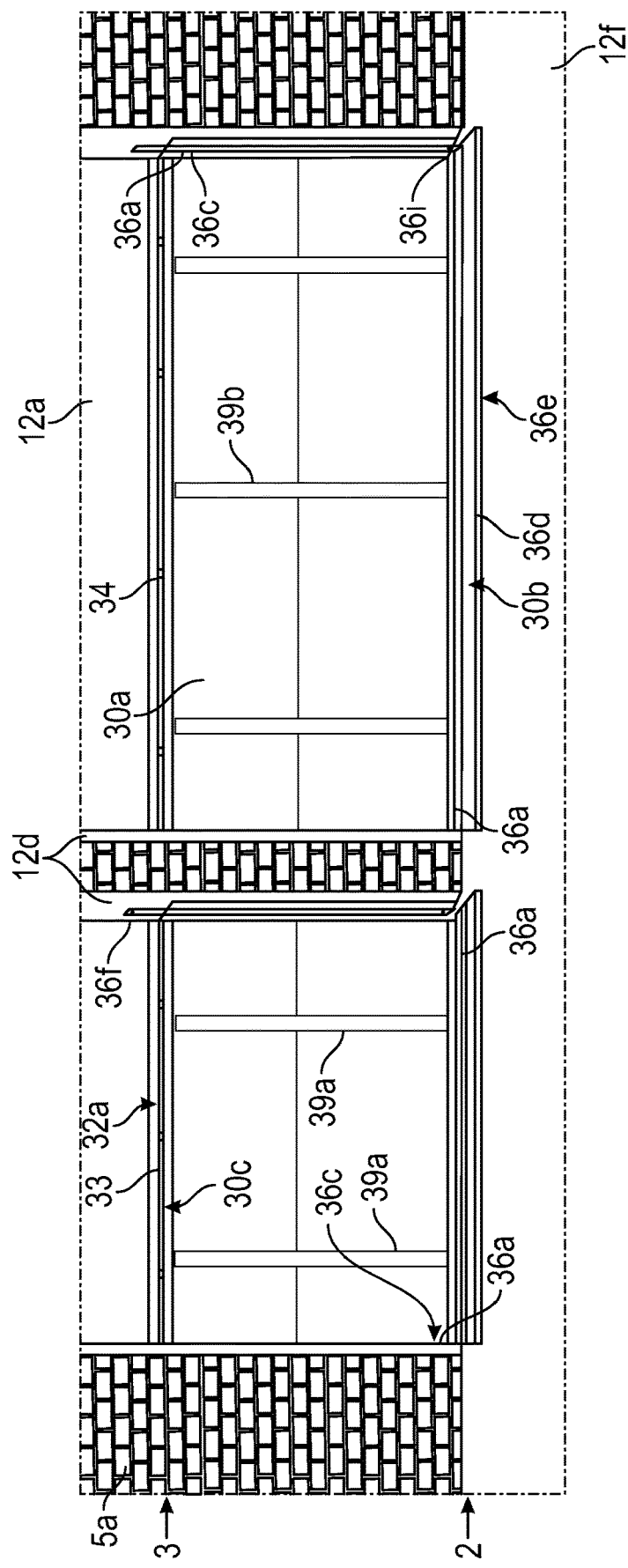
FIG. 28 is an elevation view of the garage in FIG. 2 illustrating spring bars, zipper gaskets, and other components used in the house wrap system to protect a non-sectional or solid type garage door from flooding.
Figure 29:
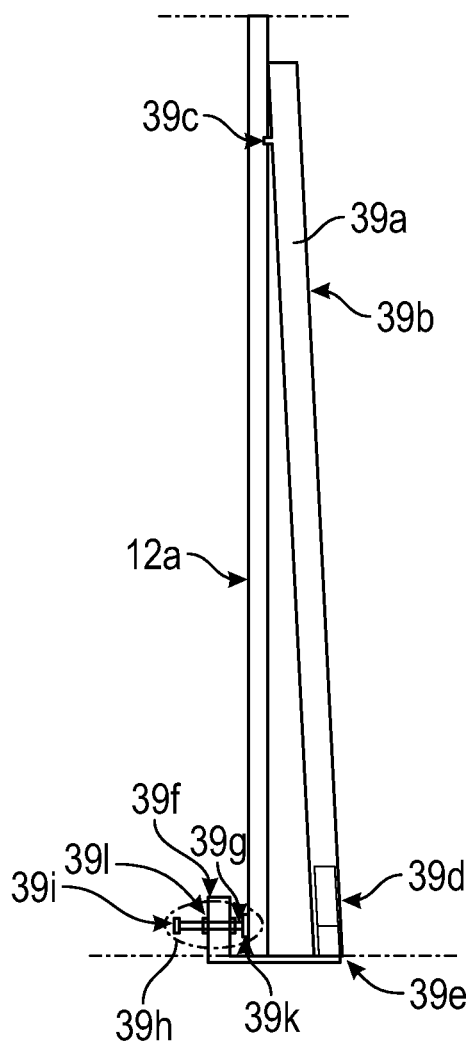
FIG. 29 is an elevation view of a garage door riser in FIG. 27.
Figure 30:
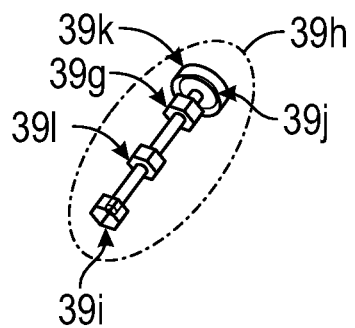
FIG. 30 is an expanded view of the area 39h in FIG. 29 illustrating the components used to secure a garage door riser.

FIG. 26 illustrates how garage door support struts 40a may be pre-configured to facilitate emergency deployment on the inside of garage doors for reinforcement to ensure the garage doors 12b can handle the hydrodynamic forces imparted by encroaching flood waters. Support struts 40a are L-brackets with an approximately 1' long horizontal member having a 5/16" mounting hole for anchoring to the garage floor substrate 12g and an approximately 2' long vertical member, which will be aligned with the inside of garage door 12b. Each support strut 40a is pre-configured during pre-flood prep by pre-setting a ¼" threaded masonry anchors 40b into garage floor substrate 12g for use with hex bolt fasteners 40c. Support struts 40a should be deployed approximately every 4' along the inside of the garage door 12b during emergency deployment immediately preceding the flood event using ¼" bolt fasteners 40c to maintain the support struts 40a in the proper position along in garage floor substrate 12g.

FIGS. 27-30 illustrate how the House Wrap System is used to protect non-sectional type garage doors 12a adjacent to masonry veneer walls 5a. The first deployment step includes securing J-shaped garage door risers 39a approximately every 4 to 6 feet along the base of garage door 12a, which are used to provide vertical support for poly-wrap sheeting panels 30a adjacent to non-sectional type garage doors 12a.

Garage door risers 39a are designed to wrap around bottom end of garage door 12a when the garage door 12a is closed. Each garage door riser 39a is comprised of the following components: (a) vertically-oriented inner frame 39f made from approximately ¾" aluminum or steel square tube with a height of approximately 2" is welded at a 90° right angle onto the outer edge of a horizontally-oriented aluminum or steel base plate 39e with approximate dimensions of ¼" thick by 1" wide by 5" long, (b) vertically-oriented outer riser stub 39d also made from approximately ¾" aluminum or steel square tube with a height of approximately 3" is welded onto the other end of base plate 39e with an approximately 3° angled inward cant (toward garage door 12a), (c) an approximately 5/16" hole protruding through the inner frame 39f approximately 1" above base plate 39e, which has a ¼" nut 39g welded on the inside of the inner frame 39f adjacent to the hole, (d) a riser tightening apparatus 39h comprised of a ¼" diameter by approximately 2.5" long threaded bolt 39i with a ¼" lock nut 39l, which is then screwed into the ¼" welded nut 39g and an approximately ¾" diameter round threaded pressure plate 39j, which screws onto the end of the bolt after installation into the ¼" welded nut 39g. Prior to securing the riser tightening apparatus 39h, an approximately 24" tall vertically-oriented riser 39b made from 1" square tube aluminum or steel and having a tab or clip 39c at its upper end is slid over the inward slanting ¾" stub 39d located adjacent to the outside edge of the garage door 12a. After tightening the garage door riser 39a to the bottom 12e of the garage door 12a, the ¼" lock nut 39l secures the garage door riser 39a in place. Garage door risers 39a are tested and labeled during pre-flood prep.

Figure 22:
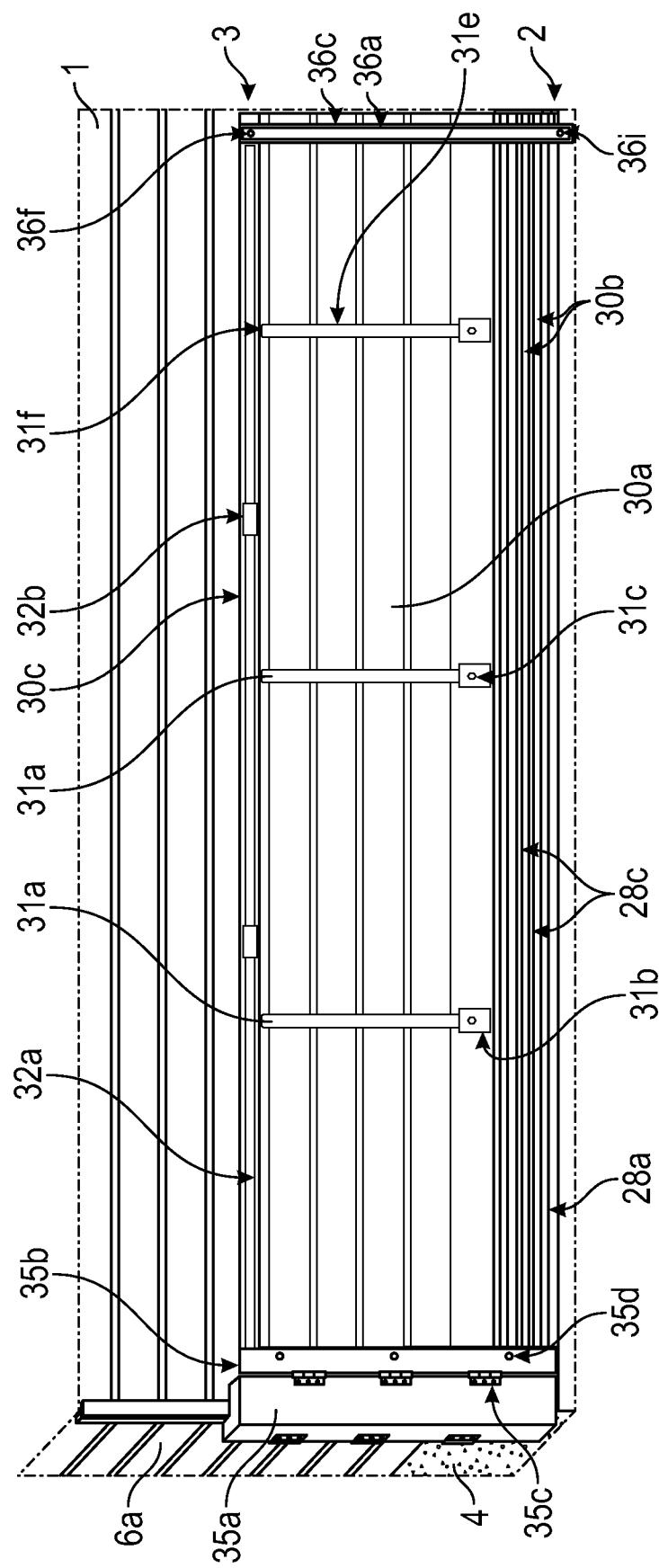
FIG. 22 is an elevation view of the home in FIG. 1 illustrating a poly-wrap sheeting panel, stiffeners and other components used in the house wrap system at an early stage of deployment.
Figure 23:
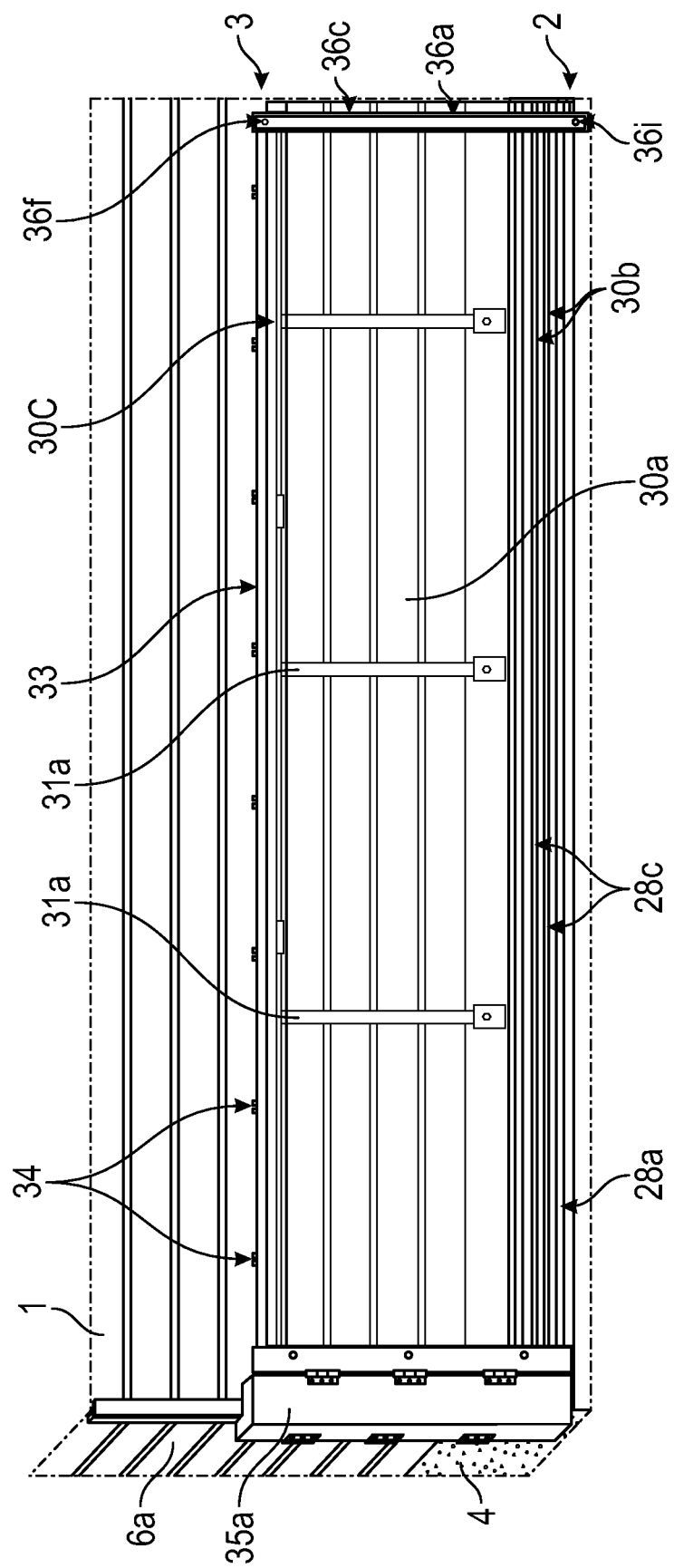
FIG. 23 is another elevation view of the home in FIG. 1 illustrating a top seal gasket, top seal clips and other components used in the house wrap system at a later stage of deployment.

Garage door risers 39a are used with poly-wrap panels 30a, poly-wrap stiffeners 32a contained within sleeves 30c, poly-wrap top seal gasket 33, top seal clips 34, spring bars 36a, spring bar foam gaskets 36c, and zipper mats 38a to protect the area around garage door 12a in a manner similar to the function of the vertical wall risers 31a in FIGS. 22-23. Approximately 12" wide zipper mats 38a are deployed along the front of garage door 12a after initial deployment of the garage door risers 39a and represent an alternate method to spring bars 36a and spring bar zipper gaskets 36d for hosting the dual female zipper connections 38c to mate with dual male connections of the sheeting panels 30a at floor substrates. The base material 38b of zipper mats 38a should be suitable flexible water proof fabric such as approximately 30 durometer closed-cell waterproof neoprene, which is approximately 1/16" thick. Zipper mats 38a host an integral dual female zipper connection 38c along one edge and on the top of the base material 38b. The underside of the base material 38b hosts an approximately ¾" wide by 5/16" thick closed-cell foam strip 38d along the opposite edge to where the dual zipper connection 38c is hosted and another similar foam strip 38d near the center of the approximately 12" wide base material 38b. The underside foam strips 38d are compressed by placing a weight distributing board (e.g. 2" high by 8" wide pine board) and water-activated sand-less weight bags, sand filled bags, bricks, rocks, or any other weighting material 38e on the top side of zipper mats 38a and with a slight offset to the dual female zipper connection 38c. The plastic male zipper connections 30b on the bottom of the sheeting panels 30a in front of garage doors 12a are then attached to the female zipper connections 38c of zipper mats 38a. Zipper mats 38a are available in bulk rolls and may be cut-to fit using scissors to facilitate customized solutions to accommodate specific House Wrap System requirements and specifically in substrate areas where zipper strips 28a and horizontally-oriented spring bars 36a with spring bar zipper gaskets 36d cannot be deployed effectively (e.g. in front of certain doors, porches, and patios).

Approximately 2.5" by 2.5" by ⅛" thick steel L-shaped corner braces 41 are used to aid in sealing the right-angle intersections between spring bars 36a, sheeting panels 30a, zipper strips 28a, and/or zipper mats 38a near GLE 2. Corner braces 41 have integral approximately 1" wide by ¾" thick closed-cell foam gaskets, but in cases where additional gaps must be filled, spring bar foam gasket material 36c may be used. To deploy the corner braces 41 and gasket material 36c, one person holds poly sheeting 30a and/or the zipper mat 38a in place while a second person installs the corner brace 41 using a cordless drill and ¼" screw fasteners 36g through four provided 5/16" holes along both ends of corner brace 41 and into pre-drilled 3/16" holes in the substrate 12f or exterior wall 5a. Tightening down on screw fasteners 36g of corner brace 41 anchors the sheeting panels 30a and/or zipper mat 38a while compressing its integral foam gasket and/or the additional foam gasket material 36c.

Figure 31:
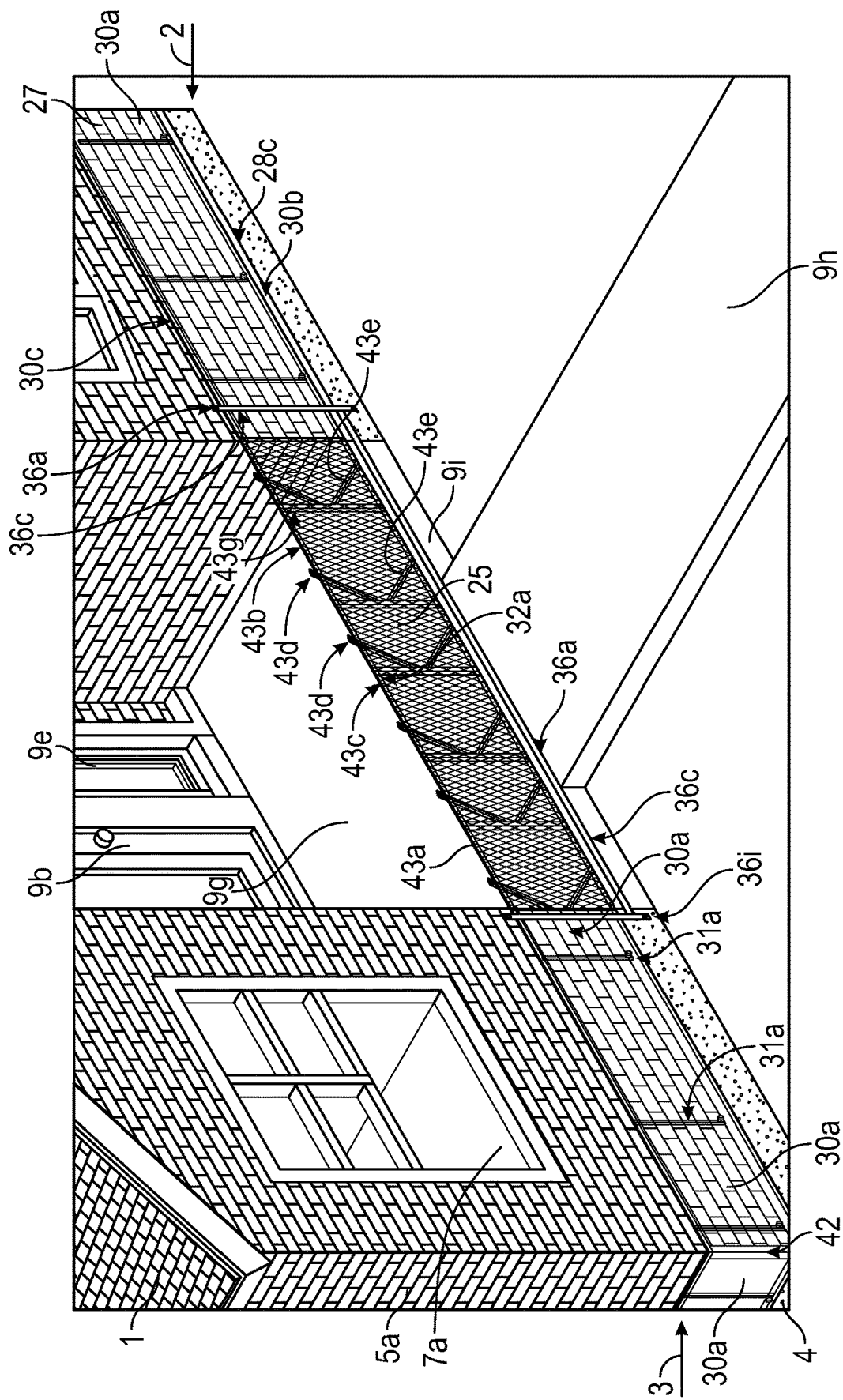
FIG. 31 is a perspective view of the home in FIG. 1 illustrating an entry way protection assembly used in the house wrap system to protect fragile doors and windows from flooding.
Figure 32:
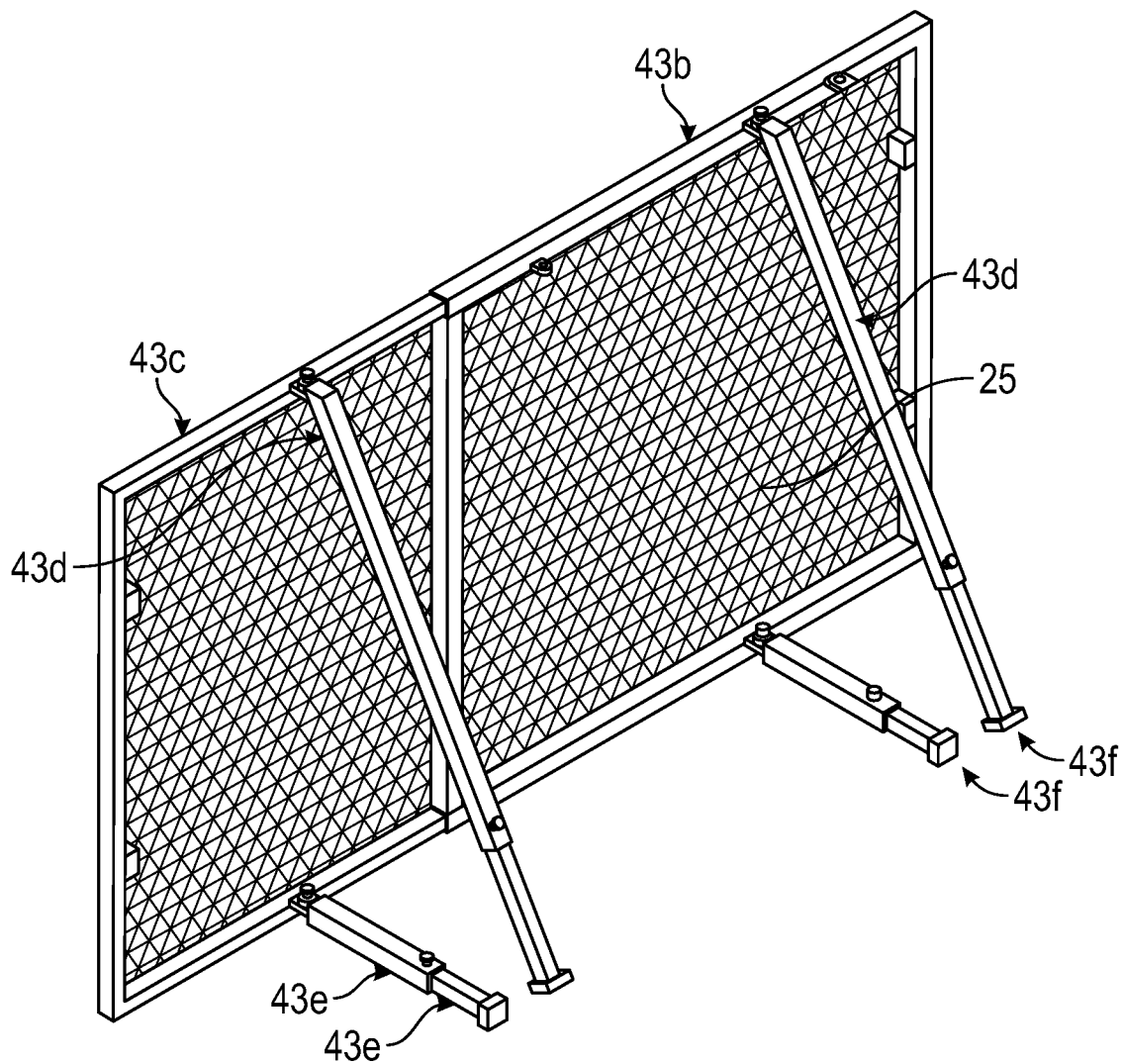
FIG. 32 is a perspective view of the entry way protection assembly components in FIG. 31.

Referring now to FIGS. 31-32, entryway protectors 43a are used to protect relatively fragile doors 9b and glass windows 9e at recessed exterior entryways 9a and are available in multiple pre-defined widths. Each pre-fitted protector assembly 43a includes an approximately ¾" aluminum, PVC, or other hard plastic square tube male frame 43c, which telescopes into an approximately 1" female square tube frame 43b to expand and contract to fit the width requirement of the entryway 9a.

The bottom of the frames 43b, 43c are supported using either (a) pre-existing ledge or step 9i at the entryway 9a to prevent bottom of frames 43b, 43c from sliding toward to the building structure 1, (b) telescopic aluminum struts 43d, 43e spaced horizontally every approximately 3 to 6 feet along the front porch substrate 9g and being supported near GLE 2 against both the protector frame 43b, 43c and the nearest available ledge 9i, wall 5a, or exterior door 9b of the building structure 1, or (c) anchoring the bottom of the protector assembly 43a to a concrete or tile substrate 9g, 9h using hex bolts with pre-installed threaded anchors 43g, which are permanently set into the substrate 9g, 9h. Screw-in covers (not shown) may be used to camouflage the threaded anchors prior to deployment.

The top of the frames 43b, 43c are supported using either (a) telescopic aluminum struts 43d pinned to the top of the frames 43b, 43c and which extend to the bottom of the adjacent structural wall 5a or exterior door 9b or alternatively using pre-set threaded masonry anchors in the entryway substrate and ¼" hex bolts 43g to prop the frames 43b, 43c up when loaded against the rising flood waters, (b) cementing an approximately 1½" square tube by 18" long aluminum stanchion receiver post (not shown) into the ground or flooring substrate 9h during pre-flood prep such that the top of the receiver post is level with GLE 2 to facilitate installation of an L-shaped brace (not shown) made of 1¼" square tube aluminum by inserting the lower end of the brace into the receiver and bolting the body to the brace immediately preceding the flood event. A protective cover (not shown) may be used to protect and camouflage the stanchion receiver prior to deployment.

Exterior walls 5a on both sides of the entryway 9a provide vertical support to the protector assembly 43a. Rigid plastic lattice panels 25 are used to provide structural integrity for entryway protectors 43a so the House Wrap System can withstand the hydrodynamic forces of the encroaching flood waters at recessed fragile door and window entryway areas 9a. Poly-wrap sheeting panels 30a are sealed at the bottom using spring bars 36a with spring bar foam gaskets 36c or spring bar zipper gaskets, zipper mats, or zipper strips (not shown). The top of the sheeting panels 30a are secured by inserting poly-wrap stiffeners 32a into sleeves 30c at top of sheeting panel 30a, draping the top part of the sheeting panel 30a over protector assembly 43a, then clipping the sleeve 30c containing the stiffener 32a into slots built into the inside edge of the square tube frames 43b, 43c at the top of the protector assembly 43a. The roof overhang of building structure 1 is required to protect the area against wind-driven rain.

Rigid foam corner protectors 42 are L-shaped foam pieces (approximately ⅛" thick with 4" sides and 30" tall) used for protecting sheeting panels 30a from wind-induced abrasion at corners of exterior walls 5a and/or windows 7a after emergency deployment.

Figure 33:
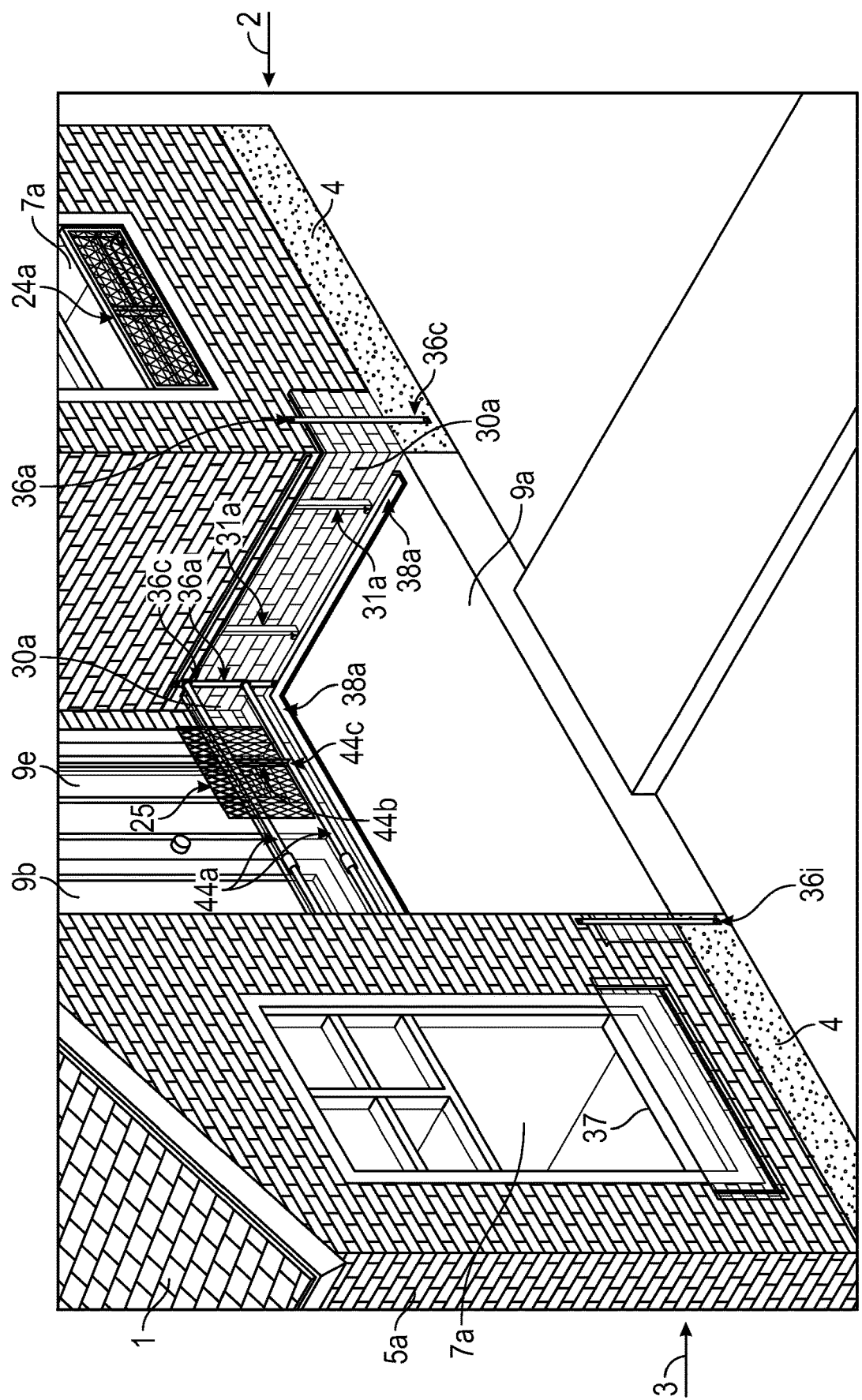
FIG. 33 is a perspective view of the home in FIG. 1 illustrating an alternate entry way protection system in the house wrap system to protect doors and windows from flooding.

FIG. 33 illustrates an alternative method to protect entryway 9a, recessed windows 7a extending below the DFE 3, and exterior doors 9b from encroaching flood waters. During pre-flood prep, a poly-wrap sheeting panel 30a is sized and labeled to completely cover the horizontal span of window 7a and/or door 9b area to be protected from slightly above GLE 2 to the DFE 3. For window applications, the bottom of the sheeting panel 30a is anchored and sealed against the exterior wall 5a using either (a) a pre-sized and labeled spring bar 36a with a spring bar foam gasket 36c at a location just below the window 7a using hex bolt fasteners 36i screwed into pre-set wall anchors 36h (or screws) or (b) using zipper strips (not shown). For door applications, the bottom of the sheeting panel 30a will be sealed using a zipper mats 38a. Both sides of the sheeting panels 30a are anchored and sealed against the exterior wall 5a using pre-sized and labeled spring bars 36a and spring bars gaskets 36c using bolt fasteners 36i (or screws). During emergency deployment for recessed window 7a applications, the upper end of the sheeting panel 30a is sealed at the DFE 3 using all weather wet/dry tape 26, which is removable after the flood event passes. Batting panels 37 are used to substantially fill window 7a and door 9b recesses with soft padding material sealed in plastic wrap so that the filled surface is approximately flush with the adjacent exterior walls 5a, which facilitates faster deployment of simple rectangular-shaped sheeting panels 30a using spring bars 36a and spring bar foam gaskets 36c. Batting panels 37 are made from recycled compressed denim (or other suitable padding material) and should be available in various thicknesses to facilitate custom fitting during pre-flood prep.

During a flood event, the batting material 37 also offers protection for glass and other fragile components of the window 7a and door 9b areas against impact damage from floating debris. Alternatively, pre-fitted rigid plastic latticework panels 25 may be used to protect the fragile window 7a and/or door 9b areas.

Expansion bars 44a may be used as an alternative to ¼" bolt fasteners 36i and pre-set threaded anchors 36h to compress each end of the spring bars 36a with spring bar foam gaskets 36c, which seal the sheeting panel 30a along both of its side edges against the exterior wall 5a, recessed window frame 7b, or door frame 9c. Both sides of the sheeting panel 30a are anchored and sealed against the exterior wall 5a using pre-sized and labeled spring bars 36a with spring bar foam gaskets 36c using one expansion bar 44a positioned across the top and another positioned across the bottom of the door 9b or recessed window 7a to be protected. Expansion bars 44a are approximately 1" in diameter and are manufactured of steel or aluminum with a design similar to ratchet-type cargo bars or spring-loaded, rotation-actuated tension bars. Expansion bars 44a are used to apply the force necessary to straighten spring-loaded spring bars 36a and compress its underlying foam gasket 36c to anchor and seal the sheeting panel 30a against the exterior wall 5a. Expansion bars 44a are available in multiple length ranges (e.g. 30-70" and 71-104"). One or two vertically-oriented aluminum or PVC cross-support struts 44b may be used to stabilize the two expansion bars 44a. C-shaped end clips 44c on the cross-support struts are designed to attach to the expansion bars 44a to ensure they do not bow inward or outward.

Figure 34:
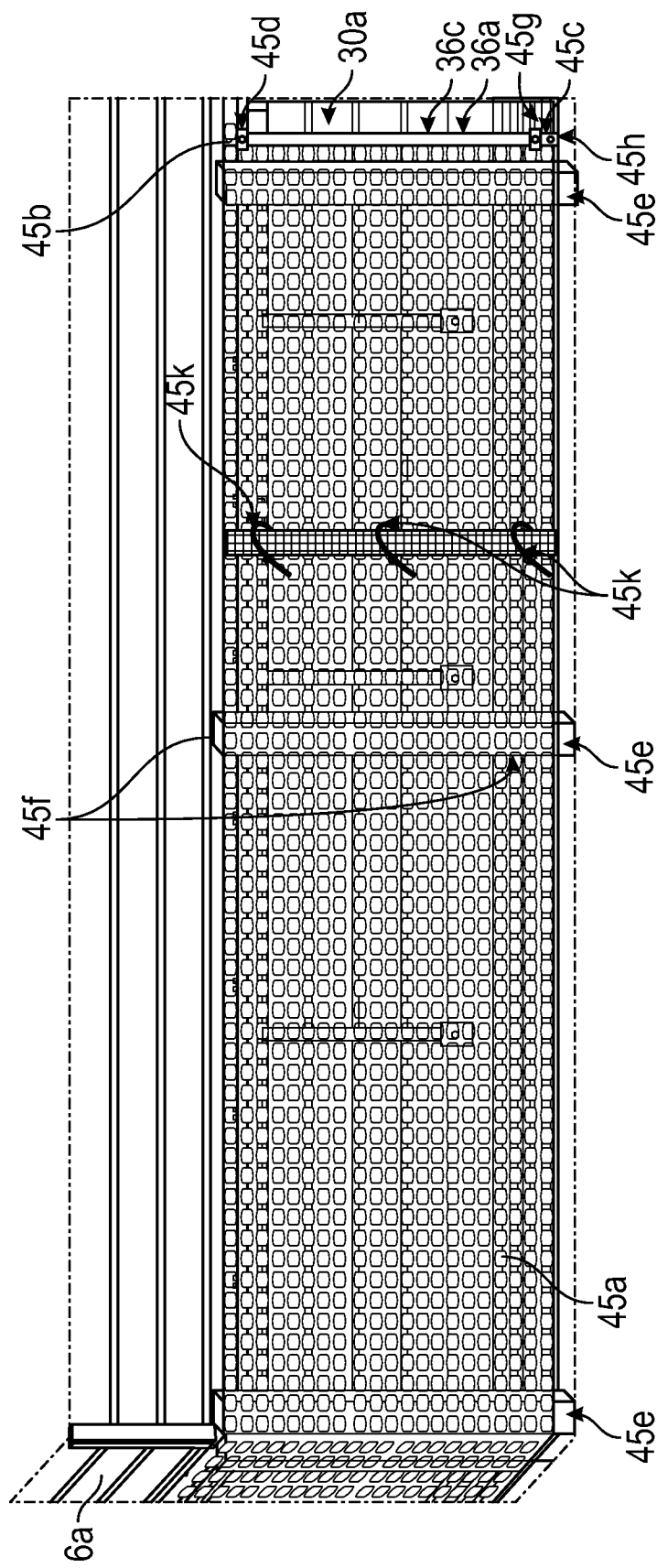
FIG. 34 is a perspective view of the home in FIG. 1 illustrating an optional debris barrier used in the house wrap system to provide additional protection from flooding.

Referring now to FIG. 34, an optional debris barrier solution is disclosed, which includes light-weight square mesh plastic netting, which is pre-fitted to cover walls, windows, and doors where the House Wrap System has been deployed. The debris barrier solution may be quickly deployed immediately preceding an impending flood to protect the poly-wrap against damage from wind and floating debris. Debris barrier netting 45a deployed from rolls is approximately 36" wide and has approximately 1.25" square mesh and is made from high yield strength LLDPE or similar plastic material. The netting 45a initiates and terminates into spring bars 36a or using suitable fasteners at wall corners or other locations along an exterior wall 6a as a final step to protect the house after installation of poly-wrap sheeting panels 30a. The netting material 45a is cut-to-fit and labeled during pre-flood prep along with related solution components to facilitate emergency deployment. Each end of the pre-fitted netting material 45a includes a vertically-oriented debris barrier tension bar 45b, which is weaved into the square mesh during pre-flood prep. These approximately 1" wide by ⅛" thick by 30" tall bars 45b are made from steel or aluminum and are either latched onto previously deployed spring bars 36a using J-hook flat washers 45c (or other suitable means) or the 5/16" holes 45d pre-drilled at both ends to accommodate ¼" bolt fasteners 45h screwed into preset wall anchors during emergency deployment.

Deployment includes first positioning debris barrier spacer blocks 45e in a vertical orientation extending from GLE 2 to above the DFE 3 on both sides of each outward-facing corner of exterior wall 6a, within approximately 4" of each netting material 45a initiation/termination point, and in the case of relatively long exterior wall spans, every approximately ft. The spacer blocks 45e are designed to provide approximately 6" standoff between the outer netting material 45a and the previously deployed poly-wrap sheeting panels 30a. The spacer blocks 45e are approximately 6" square by 36" tall and are made from lightweight, low cost, closed-cell extruded polystyrene foam (e.g. Styrofoam™). To facilitate emergency deployment of the netting material 45a, hook n' loop fasteners 45f (e.g. Velcro®) may be pre-installed on each end of the spacer blocks 45e (inner edge) and on the sheeting panels 30a at the planned deployment locations during pre-flood prep. These hook n' loop fasteners 45f ensure quick and easy positioning of the spacer blocks 45e in a vertical orientation at designed locations during deployment of the netting material 45a during inclement weather.

The next step in the deployment process includes anchoring one end of a netting material 45a in a vertical orientation from GLE 2 to the DFE 3 by latching a tension bar 45b onto a previously deployed spring bar 36a installed using J-hook flat washers 45c with ¼" bolt fasteners 36i screwed into threaded masonry anchors 36h pre-set into exterior wall 6a. An alternative method for anchoring the end of netting material 45a includes using ¼" bolts 45h, which extend through the ⁵⁄₁₆" holes provided at each end of the tension bars 45b and directly into pre-set threaded anchors 45g in exterior wall 6a (or using screw-type fasteners). The netting material 45a is then unrolled to extend the high strength netting material 45a completely around the walls 6a, exterior doors, and windows to be protected before securing the other end of the netting material 45a using similar means. A single set of pre-set wall anchors 45g and ¼" bolt fasteners 45h may be used to secure the ends of two netting material 45a extending in different directions (e.g. double stack tension bars 45b). Multiple rolls of netting material 45a may be joined with approximately 4" zip ties 45k as required to cover longer deployment runs of netting material 45a. The pre-fitted and labeled netting panels 45a is sized such that the netting material 45a will be slightly taught after initial deployment by two people.

Debris barrier tensioner (not shown) is a lever-actuated, rack n' pinion ratcheting tool with integral dual 3-hook stretcher bars and is used along with approximately 4" zip ties 45k to further tighten the netting material 45a to provide the required netting tension to deflect floating debris and to apply compression force of the spacer blocks 45e against the previously deployed poly-wrap sheeting panels 30a. After engaging the mesh openings of the netting material 45a on both sides with the tensioner 45j in near full extension position, the rachet device of tensioner 45j is used to apply tensile force to the netting material 45a as it is pulled taught to compressed the spacer blocks 45e against the poly-wrap sheeting 30a, thus ensuring the protection of the components of House Wrap System from damage caused by wind and floating debris. A torque limiter is provided in the rack n' pinion device 45j to prevent damaging the various components of House Wrap System from overpull.

An alternative method for creating the final tension of netting material 45a without using the debris barrier tensioner 45j involves bunching the netting material 45a in middle of a panel run, then threading approximately 18" zip ties 45k through the mesh openings of netting material 45a, and then cinching down on the ties 45k either manually or using a zip tie tensioning tool (e.g. cable tie tightening gun). The netting deployment will be designed to circumvent inner corners of exterior walls 6a whenever possible by directly spanning from outer corner to outer corner of exterior walls 6a.

Figure 35:
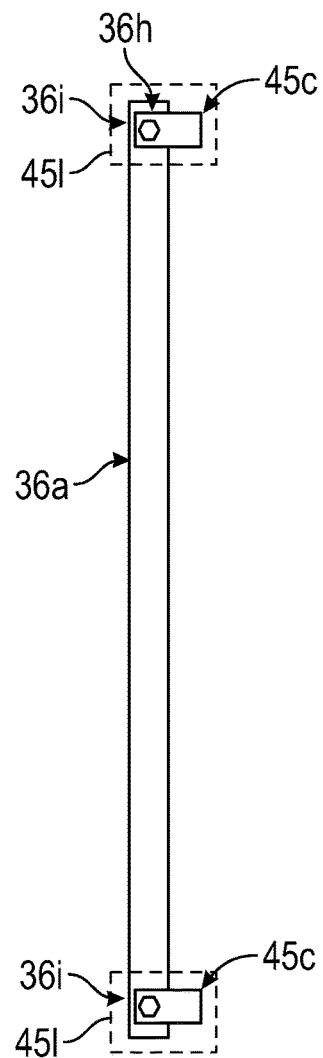
FIG. 35 is a plan view of the spring bar in FIG. 34.

FIG. 35 is a plan view of a spring bar 36a deployed using J-hook flat washers 45c of the optional debris barrier solution and ¼" bolts 36i screwed into threaded anchors 36h pre-set in exterior wall 6a with 45l highlighting the area around J-hook flat washer 45c.

Figure 36:
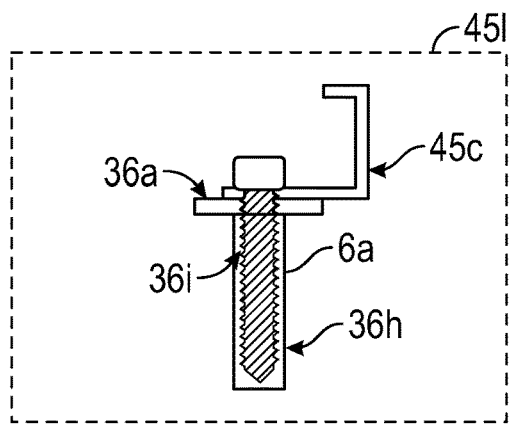
FIG. 36 is an expanded view of the area 45l in FIG. 35 illustrating the bolt and anchor used to secure the spring bar.

FIG. 36 is a side view of the area 45l in FIG. 35 and illustrates spring bar 36a deployed using J-hook flat washers 45c and ¼" bolts 36i screwed into threaded anchors 36h pre-set in exterior wall 6a.

Optional House Wrap System:

An optional embodiment of the House Wrap System is also a highly configurable, integrated solution for protecting exterior walls, doors, and windows to the DFE using pre-fitted, scrim-reinforced polyethylene sheeting (or similar waterproof sheeting material) and debris barrier netting, which are deployed immediately preceding a flood. Other solution components of this optional House Wrap System include removable all-weather adhesive, non-removable all-weather tape, rigid plastic lattice panels, flexible batting panels, rigid foam corner protectors, garage door support struts, entryway protectors, debris barrier tension bars, debris barrier spacer blocks, and fastening apparatus. This system is also uniquely designed to protect low-lying bay windows, garage door areas, and exterior walls, which are not constructed using brick or masonry veneer, but may also be used as an optional method to protect recessed windows and exterior doors and/or for redundant protections when used along with the other systems described herein.

In one embodiment, the removable all-weather adhesive used to temporarily attach the poly-wrap sheeting to various external building surfaces and establish a waterproof seal is a curable paste which may be used effectively on any porous or non-porous surface in either a wet or dry condition. Using a small putty knife (e.g., approximately 1 inch wide), the adhesive paste is applied as a continuous outline along the perimeter of where discrete panels of the poly-wrap sheeting material will be installed. Each panel is then installed by firmly pressing the sheeting panel into the exterior building surface adjacent to the location where the adhesive paste was applied. The adhesive paste is designed to establish sufficient bond and sealant properties immediately after it is applied to join and seal the poly-wrap sheeting to the exterior building surface even if the material becomes completely submerged in water. After the extruded paste cures and hardens (e.g., with the application of heat and/or adequate curing time), the solidified paste maintains a strong adhesive bond and waterproof seal between the building surfaces and the poly-wrap sheeting material. However, after a flood threat subsides, the poly-wrap sheeting and hardened paste material may be peeled off the exterior building surface by applying a moderate amount of tensile force. If any adhesive paste residue remains on the building surface during this removal process, it may be removed using a high pressure washer with water and/or a solvent fluid. Application of heat or a cooling stream to the hardened paste material may be used to facilitate its complete removal. Furthermore, the adhesive paste may be comprised of acid soluble material to facilitate its removal using acidic, low pH fluid.

In a second embodiment, the removable all-weather adhesive is double-sided tape having a general purpose non-removable film adhesive on the interior side for adhesion to the flexible poly-wrap sheeting material. A removable gel adhesive is provided on the exterior side of the tape for adhesion to a variety of porous and non-porous exterior building surfaces in either wet or dry conditions using only moderately applied finger pressure for extrusion onto smooth or rugose exterior building surfaces.

In a first design, the exterior side of the double-sided tape initially is in a semi-solid state having minimal tackiness at ambient temperatures, but is quickly converted to a sticky, malleable adhesive material by applying heat or another activation means in inclement weather during emergency deployment. Then, after the material returns to ambient temperature, the exterior side of the tape returns to a nearly solidified state while retaining its bond to the exterior building surface and providing a waterproof seal between the poly-wrap sheeting and the exterior building surface. To facilitate delivery of the product in bulk rolls and storage of the double-sided tape in warmer environments, one or both sides of the tape are covered using a protective liner (e.g., non-stick wax paper). After the flooding threat subsides, the poly-wrap sheeting along with the double-sided tape may be completely removed from the exterior building surfaces using tensile force with or without the application of a heat or cooling stream.

In an optional design, the exterior side of the double-sided tape initially has strong adhesive characteristics to all porous and non-porous external building surfaces in either wet or dry conditions and remains sticky and malleable at ambient temperatures during its entire shelf life. To facilitate delivery of the product in bulk rolls, storage and deployment of the House Wrap System preceding a possible flood event, one or both sides of the tape are covered using a protective liner (e.g., non-stick wax paper). After the House Wrap System has been deployed and the flooding threat has passed, the exterior gel side of the tape may be solidified or hardened via the application of a heating or cooling stream which also causes the gel to loses bonding strength allowing it to be completely removed from the exterior building surfaces along with the poly-wrap sheeting material using moderate tensile force.

For either gel adhesive design, an integral scrim fabric or fibrous material may be manufactured within the exterior gel adhesive side of the tape to further facilitate complete removal of the tape and poly-wrap sheeting. If any adhesive paste residue remains on the building surface during this removal process, it may be removed using a high pressure washer with water and/or a solvent fluid.

Non-removable all-weather tape is designed to join and seal various panels of poly-wrap sheeting material which have previously been installed. Non-removable all-weather tape will adhere to poly-wrap sheeting material in either wet or dry conditions and will maintain a waterproof seal between the poly-wrap sheeting surfaces.

Figure 37:
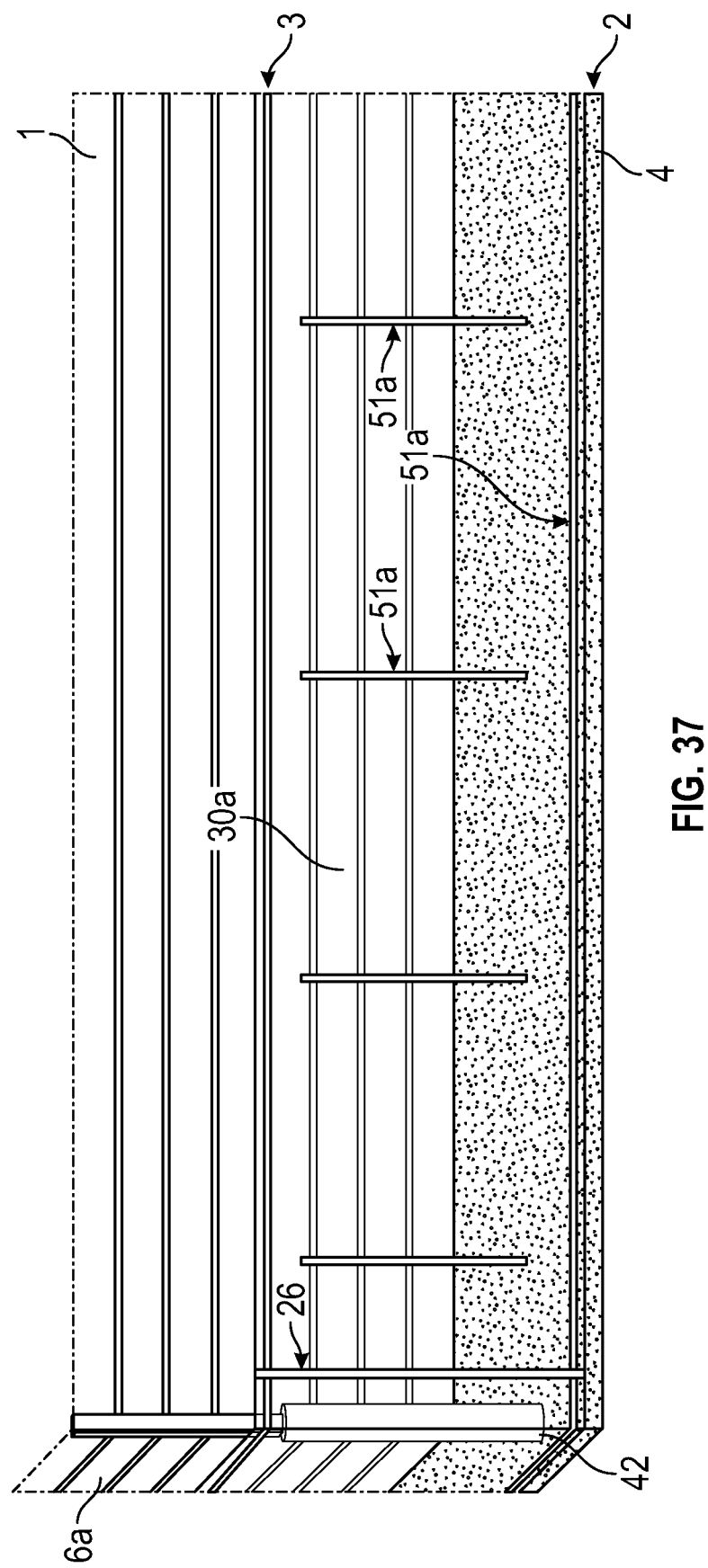
FIG. 37 is an elevation view of the home in FIG. 1 illustrating an optional house wrap system used to protect exterior walls from flooding.

FIG. 37 illustrates the basic House Wrap System in perspective view. During pre-flood prep, poly-wrap sheeting panels 30a are created by cutting various lengths of poly-wrap sheeting from the continuous rolls to custom fit the material to accommodate specific features of a wall 6a or other house component and to facilitate emergency installation in inclement weather. The individual sheeting panels 30a will then be labeled to match its respective location on the house 1. In a similar manner, other supporting House Wrap System components which are specified during pre-flood prep are labeled and stored along with the poly-wrap panels 30a to facilitate emergency installation months or years later.

During emergency deployment immediately preceding a possible flood, the exterior walls 6a and side of the concrete slab 4 from GLE 2 to the DFE 3 where each rectangular-shaped poly-wrap panel 30a will be installed should be inspected to ensure the surface is clean enough to accommodate the requirements of the removable all-weather adhesive 51a. A bristle brush and water or a pressure washer may be used to remove loose dirt, mud, or other debris from the surface of the exterior wall 6a and concrete slab 4 from GLE 2 to the DFE 3 if necessary. Each poly-wrap panel 30a should then be installed one at a time and each panel 30a should be installed at the specific location on the house per its predefined labeling instruction.

In the case that curable paste is used as the removable all-weather adhesive 51a, the installation process for each panel starts by first applying a thin, but continuous veneer (approximately ¼ inch thick and 1 inch wide) of adhesive paste to the side of the concrete building foundation 4 above, but in close proximity to GLE 2 and/or exterior wall 6a along all four edges where the panel 30a will be attached per the pre-flood prep design. Additionally, for relatively long panels 30a exceeding 4 feet in length, a thin veneer of adhesive paste should be applied as vertical strips at intervals of up to 4 feet to protect extended sections of sheeting panel 30a against wind buffeting after deployment. After applying the adhesive paste to the side of the concrete slab 4 and/or exterior wall surface 6a, the panel will be aligned to match the perimeter of the panel 30a with the outline of the continuous veneer of paste adhesive before attaching the panel 30a to the side of the concrete slab 4 and/or exterior wall surface 6a by firmly pressing the poly-wrap sheeting panel 30a into the adhesive paste before it hardens and cures.

In the case that double-sided tape is used as the removable all-weather adhesive 51a, during pre-flood prep the general purpose non-removable film adhesive on the interior side of the tape will have been permanently installed along the perimeter of the custom sized poly-wrap sheeting panels 30a and for relatively long panels 30a exceeding 4 feet in length, also in vertical strips extending from the bottom to the top of panels 30a at intervals of up to 4 feet.

According to the first design where the exterior side of the double-sided tape initially is in a semi-solid state, the emergency deployment process for each panel starts by first aligning the perimeter of the panel 30a to the side of the concrete slab 4 and/or exterior wall surface 6a to be covered per the labeling instructions before attaching the panel 30a to the side of the concrete slab 4 and/or exterior wall surface 6a by systematically heating the edges of panel 30a and underlying double-sided adhesive tape while firmly pressing the poly-wrap sheeting panel 30a and double-sided adhesive tape against the side of the concrete slab 4 and/or exterior wall surface 6a to be covered before the exterior gel side of the double-sided adhesive tape cools back to ambient temperature and solidifies.

According to the optional design where the exterior side of the double-sided tape initially has strong adhesive characteristics and remains sticky and malleable at ambient temperatures, the emergency deployment process for each panel starts by first aligning the perimeter of the panel 30a to the side of the concrete slab 4 and/or exterior wall surface 6a to be covered per the labeling instructions before attaching the panel 30a to the side of the concrete slab 4 and/or exterior wall surface 6a by systematically removing the protective liner covering the sticky gel side of the double-sided adhesive tape and then firmly pressing the poly-wrap sheeting panel 30a and double-sided adhesive tape against the side of the concrete slab 4 and/or exterior wall surface 6a to seal the panel 30a against the side of building 1 per the pre-flood prep design.

Non-removable all-weather single-sided tape 26, designed to adhere to poly-plastic sheeting 30a in either wet or dry condition, is used to attach multiple panels 30a during installation around building structure 1. Rigid foam corner protectors 42 are placed between a sheeting panel 30a and exterior wall 6a and/or side of concrete foundation 4 at the corners of the building structure 1 to protect the sheeting panels 30a from abrasion after deployment. Additionally, poly-wrap sheeting panel 30a should be secured in the vertical and horizontal positions with some "slack" to allow conformance to the house structure when hydrodynamic forces are applied in order to minimize stress on appurtenances around the building 1 and the poly-wrap sheeting panels 30a.

Figure 38:
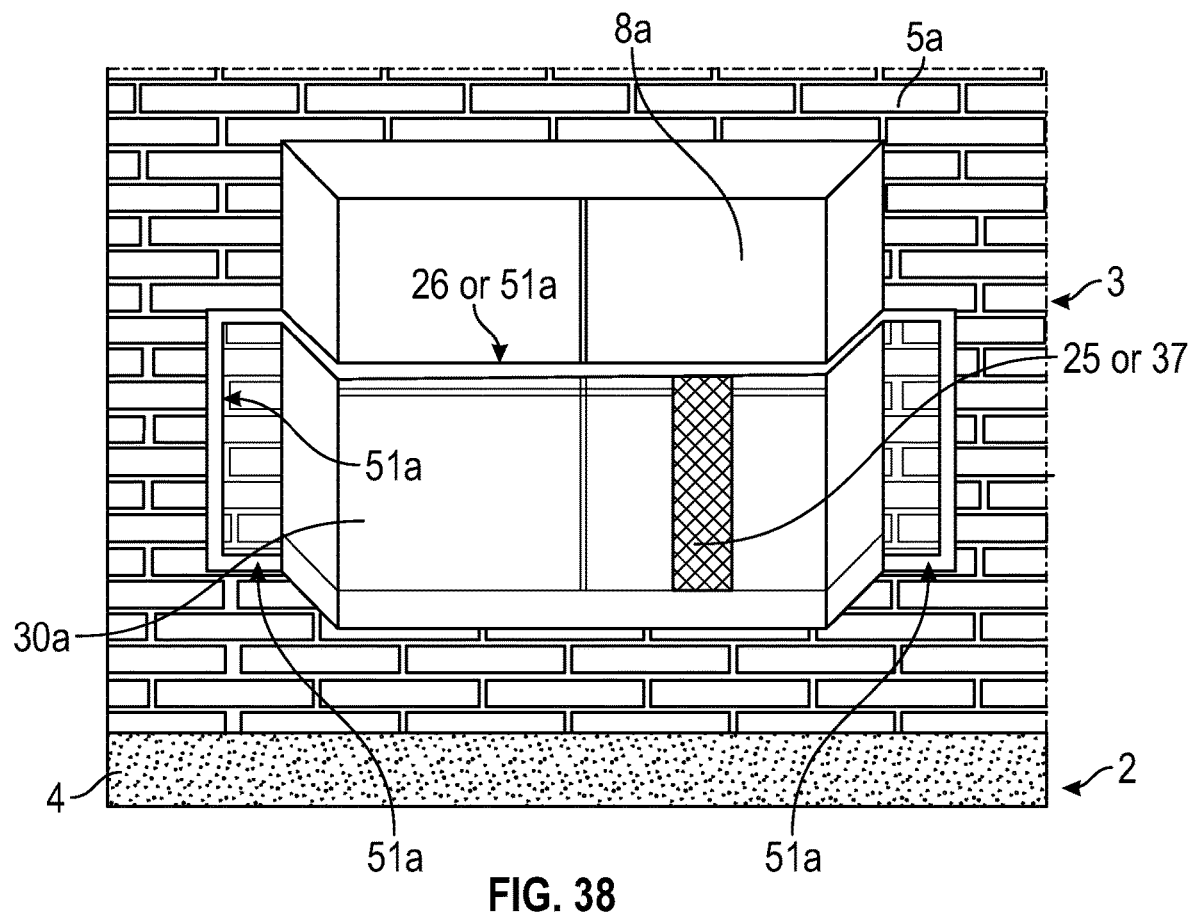
FIG. 38 is an elevation view of the home in FIG. 1 illustrating an optional house wrap system used to protect a low-lying bay window from flooding.

FIG. 38 illustrates the application of the House Wrap System to protect a bay window 8a, which extends below the DFE 3. During pre-flood prep, poly-wrap sheeting panel 30a is customized using an extrusion process to shape the sheeting material around the protruding area to be protected or optionally using poly-plastic cut-outs, which have been heat/pressure sealed or taped to form a single waterproof panel fitted to the profile of the area to be protected. Fragile glass in each bay window 8a is protected from floating debris during flooding by using either rigid plastic lattice panels 25 or optionally flexible batting panels 37, which will have been previously custom-fitted to the area to be protected and labeled during pre-flood prep to facilitate deployment. Rigid plastic lattice panels 25 are made from hard plastic and may be cut-to-fit from their standard size of approximately 1/16" thick by 35" wide by 24" tall. Flexible batting panels 37 are made from fabric or other flexible material and may also be cut-to-fit from their standard size of approximately 2" thick by 35" wide by 24" tall.

The emergency deployment process for poly-wrap sheeting panels 30a covering bay window 8a is the same as the process described for panel 30a deployment in FIG. 37 using a removable all-weather adhesive 51a. However, non-removable all-weather tape 26, which may be applied in both dry and wet conditions, may optionally be used to seal the top of the sheeting panel 30a at the DFE 3.

Figure 39:
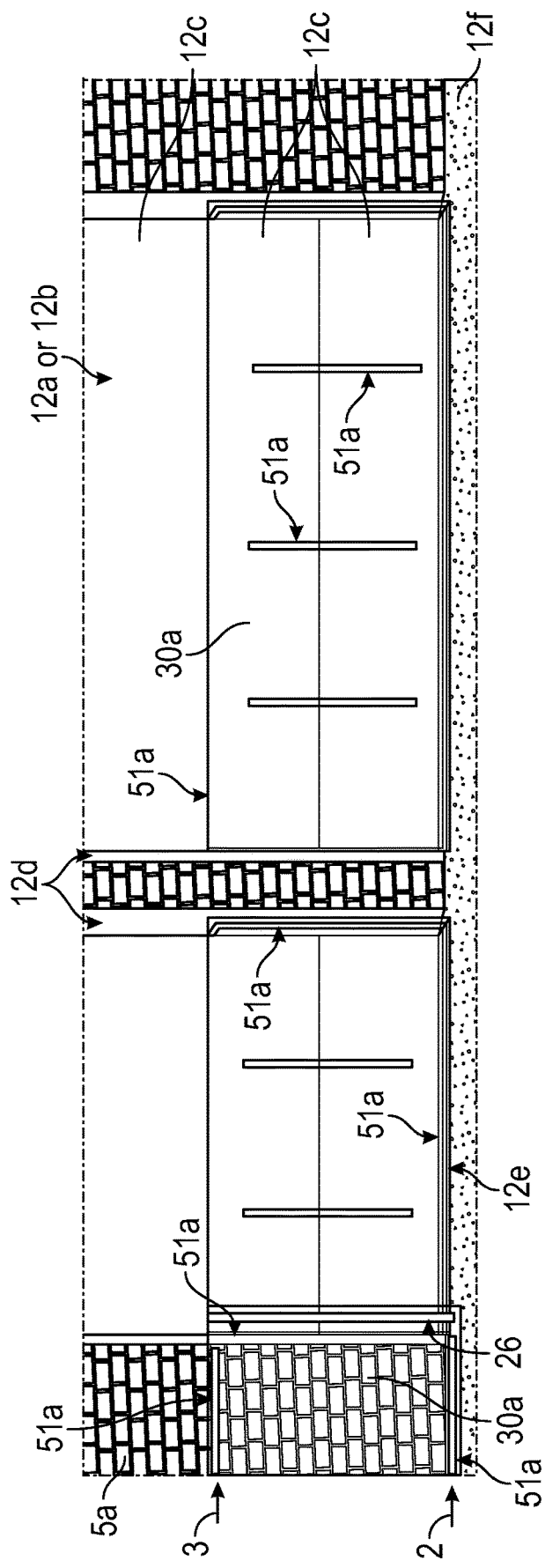
FIG. 39 is an elevation view of the home in FIG. 2 illustrating an optional house wrap system used to protect a sectional type garage door from flooding.

Referring now to FIG. 39, sectional type garage doors 12b adjacent to masonry veneer walls 5a with articulated horizontal door panels 12c may also be protected to a height at or above the DFE 3 using the integrated House Wrap System. For deployment of poly-wrap sheeting panels 30a of a suitable width (e.g. 36" or 46") across sectional-type garage doors 12b immediately preceding the possible flood event, the upper edge of sheeting panel 30a is simply folded over a few times to form a narrow ridge (e.g., approximately 1" wide) which is then tucked into the closest articulated joint of door panels 12c located above the DFE 3 prior to completely closing the garage door 12b. Upon fully closing garage door 12b, the upper end of sheeting panel 30a will be fully secured at a height slightly above the DFE 3. After securing the upper end of sheeting panel 30a, each of the remaining sides of sheeting panel 30a will be anchored and sealed to the frames 12d of garage door 12b and to the driveway substrate 12f using a removable all-weather adhesive 51a in a manner similar to the process described for deployment of panel 30a in FIG. 37. All components of this optional embodiment of the House Wrap System for protecting sectional type garage doors 12b should be configured and labeled during pre-flood prep to facilitate emergency deployment. Note that non-sectional type garage doors (not shown) may also be protected using this optional method of the House Wrap System in a manner similar to the process described in FIG. 39 except the upper edge of the sheeting panel 30a near the DFE 3 would also be anchored and sealed using a removable all-weather adhesive 51a.

Figure 40:
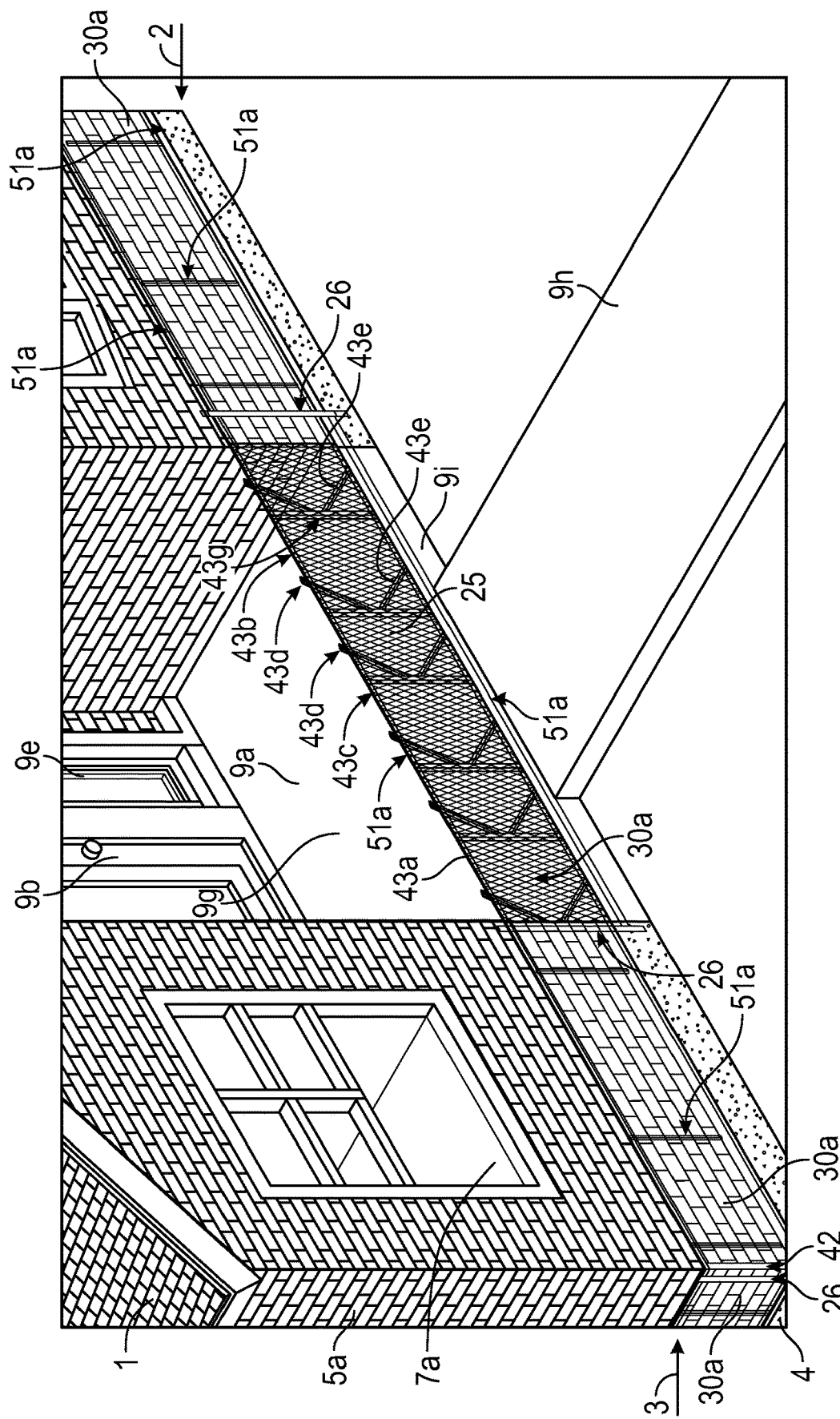
FIG. 40 is a perspective view of the home in FIG. 1 illustrating the use of an entry way protection assembly in an optional house wrap system to protect fragile doors and windows from flooding.

Referring now to FIG. 40, entryway protectors 43a may also be used with this optional House Wrap System method to protect relatively fragile front entry way doors 9b and glass windows 9e at recessed exterior entryways 9a in a similar manner to the previous House Wrap System description. However, poly-wrap sheeting panels 30a are sealed at the bottom using a removable all-weather adhesive 51a and/or sand or alternate types of weight bags (not shown). The top of the sheeting panels 30a are secured to the top of protector assembly 43a using an all-weather adhesive 51a applied to the top or outside surface of square frames 43b, 43c. Non-removable all-weather tape 26 may be used to anchor and seal the poly-wrap sheeting panels 30a adjacent to the entryway protector 43a to adjacent poly-wrap panels 30a which are being used to protect other parts of the building structure 1.

Figure 41:
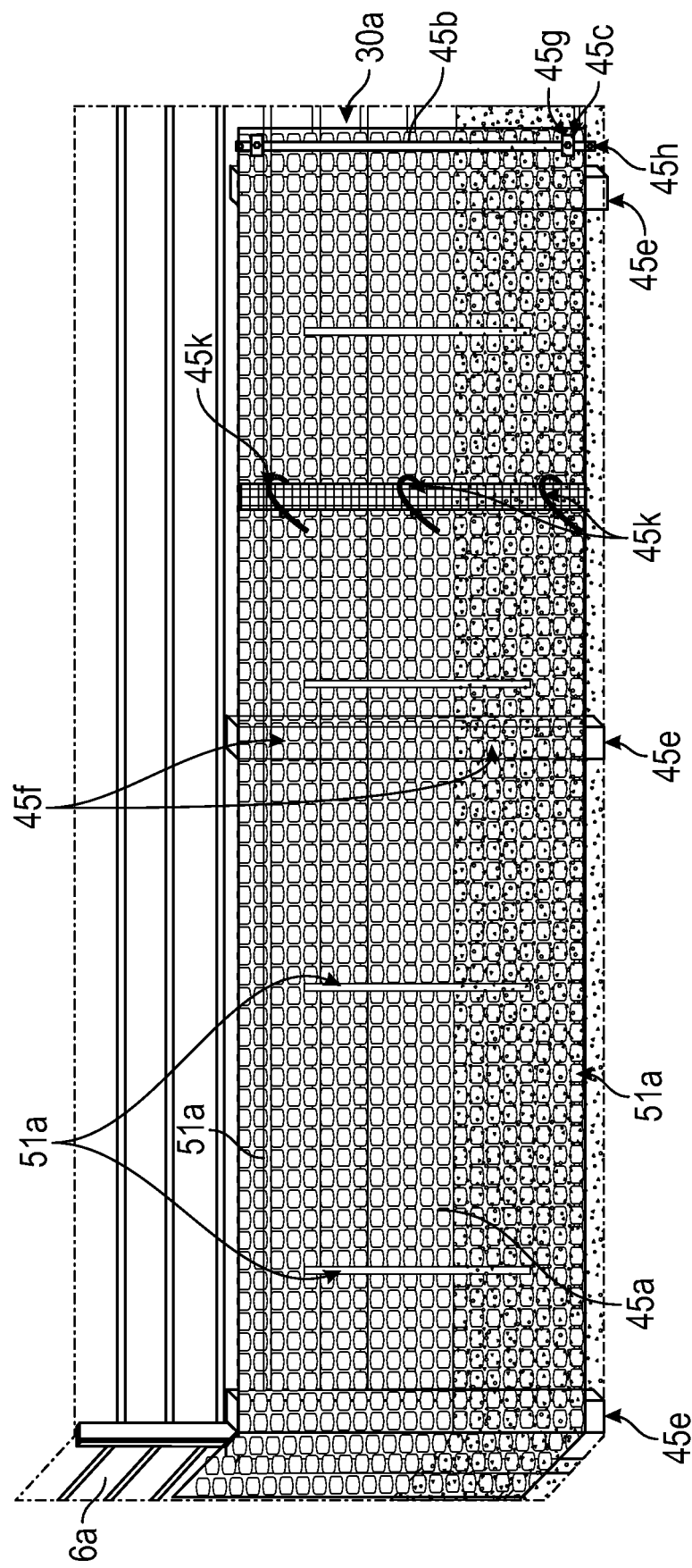
FIG. 41 is a perspective view of the home in FIG. 1 illustrating the optional use of a debris barrier in the optional house wrap system to provide additional protection from flooding.

Referring now to FIG. 41, modifications to the optional debris barrier solution previously described is presented for its use with the optional House Wrap System. During emergency deployment, the vertically-oriented tension bars 45b are latched at both ends onto previously deployed J-hook flat washers 45c which have been attached to exterior wall 6a using either 1/4" bolts 45h screwed into preset wall anchors 45g or 1/4" Tapcon® fasteners screwed into 3/16" pre-drilled holes. Optionally, the tension bars 45b may be directly attached to the exterior wall 6a at both ends using either 1/4" bolts 45h screwed into preset wall anchors 45g or 1/4" Tapcon® fasteners screwed into 3/16" pre-drilled holes.

Optional Pluggable Weep Hole System:

An optional Pluggable Weep Hole System may be used for protecting exterior masonry-veneer walls from flood waters rising up to 24 inches above the slab and includes sealing all masonry leak points below the DFE with specialty chemicals and then temporary plugging existing weep holes immediately preceding a possible flood event using removable all-weather single-sided gel tape, thus making retrofitting the existing weep holes unnecessary. This system may be deployed in conjunction with the House Wrap System for redundant protections.

The chemistry, design, and properties of the removable all-weather single-sided gel tape is envisioned to be similar to the removable all-weather double-sided gel tape previous described except the single-sided gel tape only has adhesive on one side with a flexible non-stick surface on the other side. The removable all-weather single-sided gel tape may include an integral scrim fabric or imbedded fibrous material within the adhesive gel for added strength and to facilitate easy removal by pulling the single-sided tape from the masonry surface after the flood threat passes. As described for the removable all-weather double sided tape, the single sided tape may be heat activated or could have instant grip characteristics at ambient temperature. The single-sided tape may be deployed from rolls in standard widths (e.g., 1½ inches) and may include a protective liner to facilitate delivery of the product in bulk rolls and storage of the single-sided tape in warmer environments.

Figure 42:
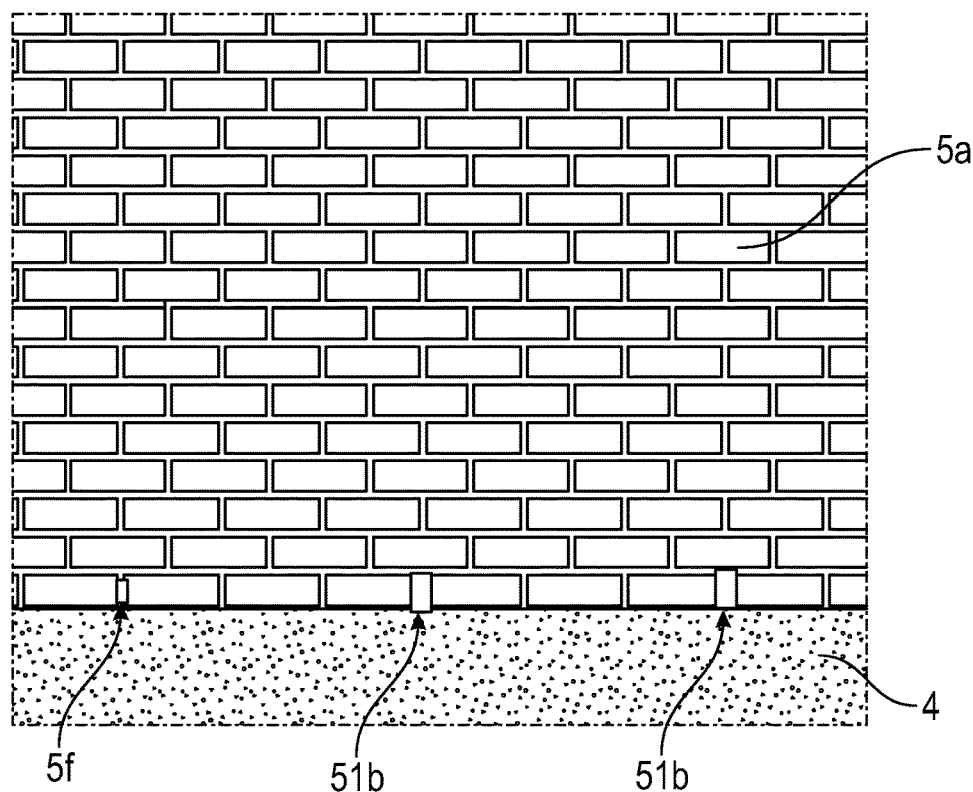
FIG. 42 is an elevation view of the home in FIG. 1 illustrating an optional method for protecting existing weep holes from water influx during a flooding event using removable all-weather single-sided tape.

FIG. 42 is an elevation view illustrating the method for protecting existing weep holes 5f located at the base of brick-veneer exterior wall 5a from flooding events using removable all-weather single-sided gel tape 51*b*. During emergency deployment immediately preceding an impending flood, a short strip of single-sided gel tape 51*b* is cut from the bulk roll using scissors to a length approximately 1 inch longer than the existing weep hole 5*f* to be completely covered. The single-sided gel tape 51*b* is then placed over the weep hole 5*f* and sealed in place by applying finger pressure to the single-sided gel tape 51*b* along the perimeter of the existing weep hole to extrude the gel adhesive against exterior wall 5*a* and/or concrete slab surface 4, thus creating a waterproof barrier to protect the weep hole from an influx of flood waters. If the gel adhesive is heat-activated, then a heat gun is used to first heat the gel adhesive in order to activate its bonding properties. In FIG. 42, two existing weep holes 5*f* have been covered with removable single-sided tape 51*b* and one existing weep hole 5*f* has not yet been protected using the removable single-sided tape 51*b*.

After the flooding threat subsides, the single-sided gel tape 51*b* covering the existing weep holes 5*f* may be completely removed from the exterior building surfaces 5*a* using moderate tensile force with or without the application of a heat or cooling stream.

Optional Door and Window Protector System:

Waterproof door sleeves represent an optional solution for protecting exterior pedestrian doors from water flooding levels up to the DFE and are comprised of custom-fitted neoprene rubber sheets and Velcro®-like hook and loop mounting straps. Prior to custom-fitting the sleeves to each door to be protected during pre-flood prep, the door frame/jamb and threshold/sill will be checked to ensure they are in proper alignment with the door and in good working condition. These door sleeves also do not require special pre-fabrication or modifications to door or window frames, however annual inspections of these areas of the building are recommended to ensure they (a) have been effectively sealed with waterproof caulking material and (b) can support the protectors along with the forces imposed by a column of water from the base of the doors and/or windows to the DFE and hydrodynamic forces including the impact of floating debris after deployment.

Figure 43:
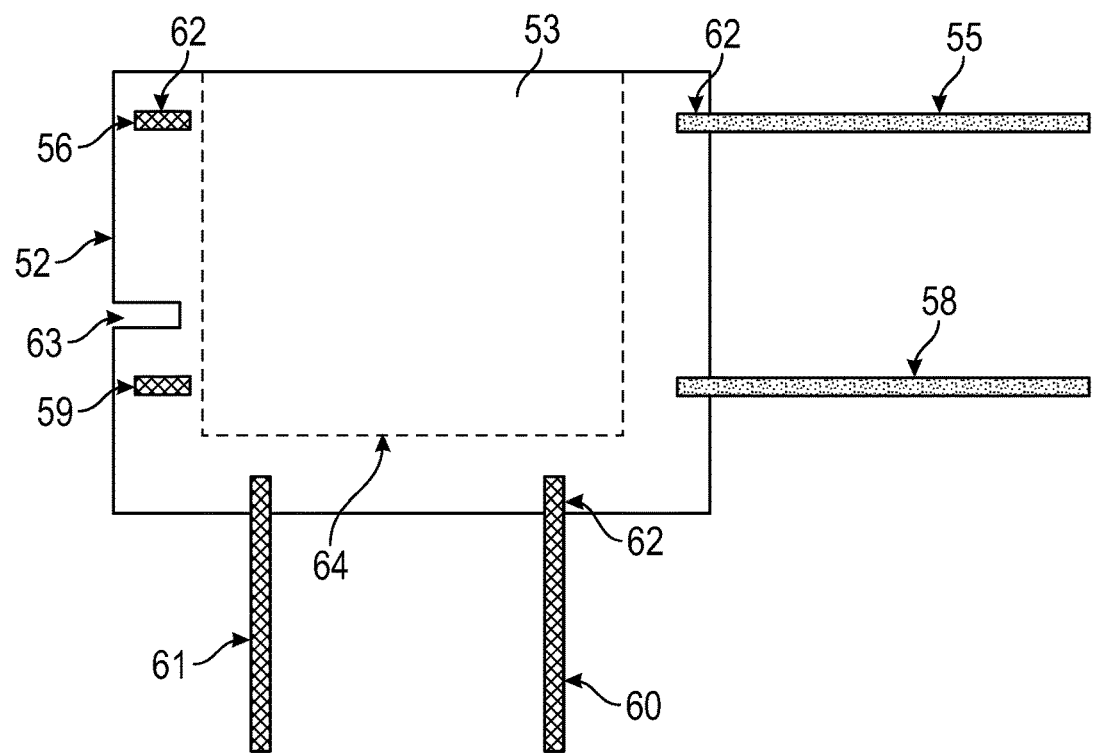
FIG. 43 is an elevation view of the exterior side of a fitted waterproof door sleeve prior to installation which may be used in an optional method for protecting an exterior door.
Figure 44:
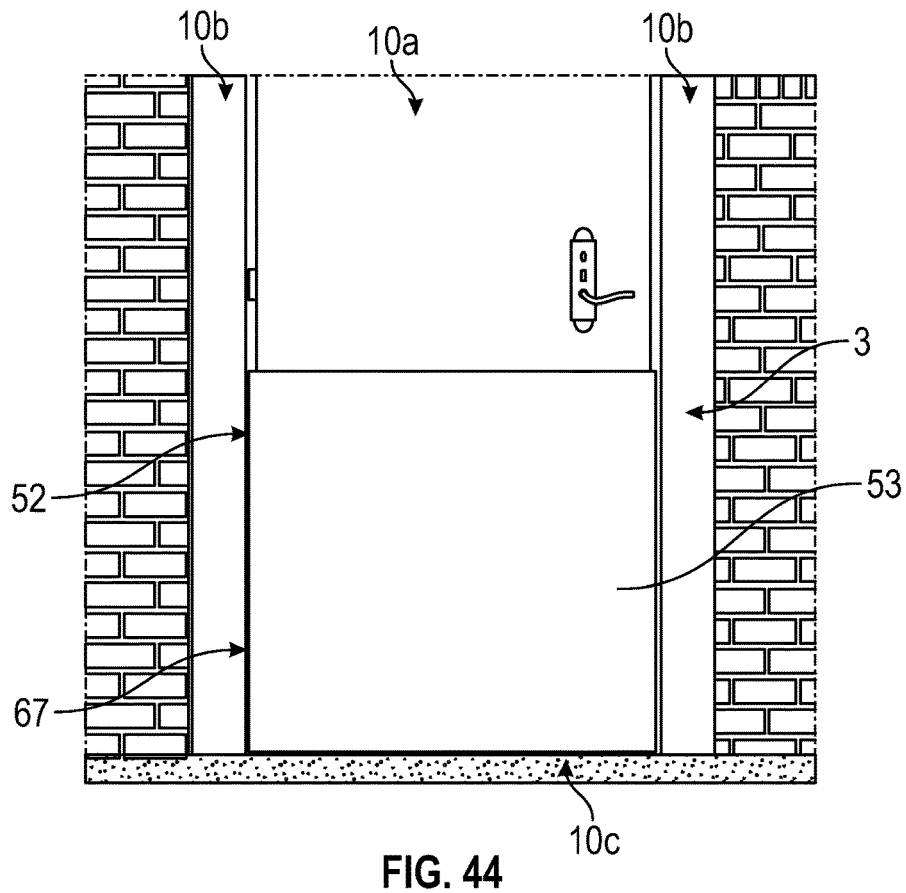
FIG. 44 is an elevation view of an installed waterproof door sleeve from the perspective of the house exterior.
Figure 45:
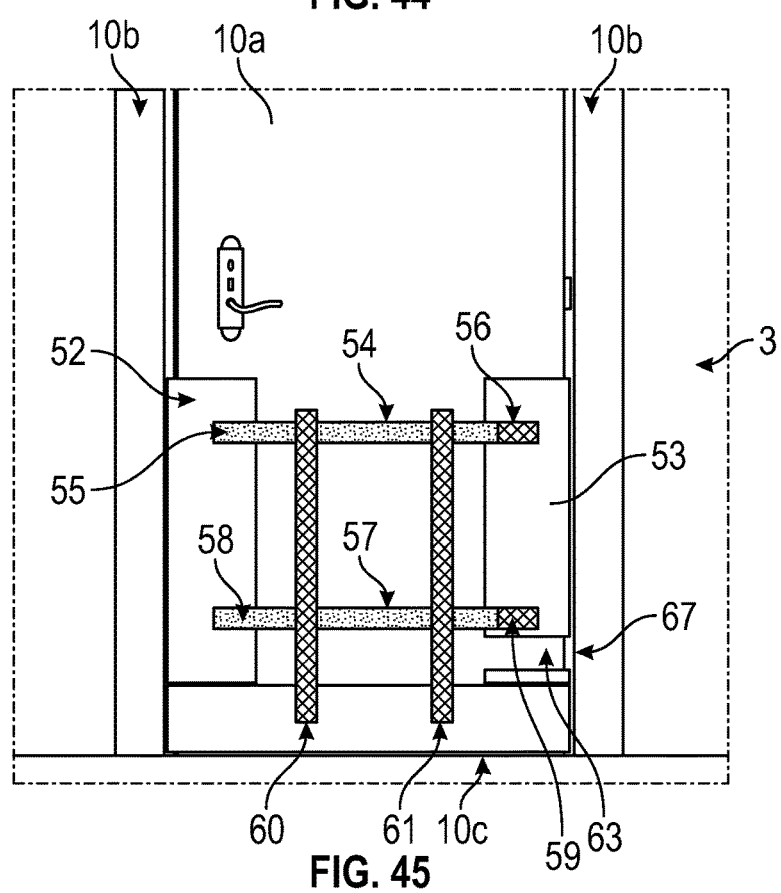
FIG. 45 is an elevation view of an installed waterproof door sleeve from the perspective of inside of the house which shows the mounting straps.

Referring now to FIGS. 43-45, a re-deployable, fitted waterproof door sleeve 52 is illustrated from several perspectives. FIG. 43 is an elevation view of the door sleeve 52 from the perspective of the exterior side of the highly expansive waterproof neoprene sheeting material 53 that will be facing the flood waters and prior to installation on the exterior door 10*a*. In FIG. 43, dashed line 64 represents the approximate location of inside edge of door frame/jamb 10*b* and door threshold 10*c* after deployment. FIG. 44 is an elevation view of an installed door sleeve 52 from the perspective of outside of the house or building 1. FIG. 45 is an elevation view of an installed door sleeve 52 from the perspective of inside of the house 1 which shows the Velcro®-like hook and loop attachment strap assemblies 54, 57, 60, 61. The height of each door sleeve 52 is designed to extend from the base of an exterior door 10*a* to at least the DFE 3.

Each door sleeve 52 is comprised of an approximately 60 durometer highly expansive, waterproof neoprene rubber sheeting 53, which is designed to wrap fully around the exterior or flood-side of the door 10*a* and partially around the opposite side of door 10*a* which is facing inside the house or building 1. A rectangular-shaped cut-out 63 along the lower end of one side of sheeting 53 is sized to allow the sleeve 52 to extend fully around the lowermost door hinge 67 during installation. An upper, horizontally-oriented, Velcro®-like, hook and loop attachment strap assembly 54 includes a relatively long loops side strap 55 which has loops on both sides of the strap and a relatively short hooks side strap 56 which has hooks only on one side of the strap. The length of the loops side strap 55 is only slightly shorter than the width of the exterior door 10*a* to be protected. The length of the hooks side strap 56 is only slightly shorter than the amount of rubber sheeting 53 that extends across the inside of the exterior door 10*a* after installation by wrapping the outer edges of the sheeting 53 around the door 10*a*. Both the loops side strap 55 and the hooks side strap 56 are permanently attached at the upper end of the door sleeve 52 near the DFE 3 using stitching, glue or other suitable attachment means 62. In a similar manner, a lower, horizontally-oriented, Velcro®-like, hook and loop attachment strap assembly 57 comprised of a loops side strap 58 and hooks side strap 59 are permanently attached at the lower end of the door sleeve 52 a few inches below the bottom of exterior door 10*a* using a suitable attachment means 62. Door sleeve 52 also includes a vertically-oriented, Velcro®-like, loops only strap 60 permanently attached on one side of the door sleeve 52 using a suitable attachment means 62 which has a length sufficient to attach to the hooks side strap 55 of the upper, horizontally-oriented, Velcro®-like, hook and loop strap assembly 54. In a similar manner, door sleeve 52 also includes a vertically-oriented, Velcro®-like, loops only strap 61 permanently attached on the opposite side of the door sleeve 52.

During installation immediately preceding an imminent flooding threat, the exterior door 10*a* is first opened, then the fitted waterproof door sleeve 52 is positioned along the outside of the door 10*a* such that the top edge of the sleeve is located approximately at the DFE 3 and on the side of the door facing potential flood waters, the middle of the sleeve in a horizontal orientation is located approximately in the middle of door 10*a*, and the side and bottom edges of the sleeve 52 wrap around the sides and bottom of the door 10*a* with cut-out 63 straddling the lower door hinge 67. After properly positioning the door sleeve 52 on exterior door 10*a*, the sleeve 52 is pulled tight across the inside of door 10*a* before securing the sleeve 52 to the door 10*a* by first attaching the upper attachment strap assembly 54 in tension, then attaching the lower attachment strap assembly 57, then attaching the two vertically-oriented hooks attachment straps 60, 61 in tension to the loops exposed on the exterior of horizontally-oriented, loops side straps 55 and 58. The door 10*a* is then closed creating a waterproof barrier across the door 10*a*, door frame/jamb 10*b*, and door threshold 10*c* up to the DFE 3.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for protecting a home or building with a slab-on-grade foundation from flood waters, which comprises:

determining a size and number of waterproof, flexible sheet(s) needed to protect an exterior area of the home or building from flooding between the foundation and a predetermined design flood elevation (DFE);

positioning each flexible sheet along a section of the foundation, one at a time, to form a bottom-end horizontal water-resistant barrier, a top-end horizontal water-resistant barrier and a pair of side vertical water-resistant barriers; and securing each flexible sheet to an exterior surface of the home or building using a removable adhesive along a perimeter of each respective flexible sheet to form a water-resistant barrier between each flexible sheet and at least one of an exterior wall, a door, and a window, wherein the removable adhesive is a double-sided tape and comprises:

a non-removable film adhesive on one side of the double-sided tape for adhesion along the perimeter of each respective flexible sheet; and a removable adhesive gel on another side of the double-sided tape for adhesion to porous and non-porous surfaces in wet or dry conditions.

2. The method of claim 1, further comprising joining adjacent flexible sheets with a non-removable tape to maintain a waterproof seal between the adjacent flexible sheets.

3. The method of claim 1, further comprising:
converting the removable adhesive gel from an initial semi-solid state with minimal tackiness at ambient temperatures to a tacky, malleable adhesive by applying heat; and
converting the removable adhesive gel back to a semi-solid state by applying the ambient temperatures.

4. The method of claim 1, further comprising removing each flexible sheet and the removable adhesive gel from the exterior surface of the home or building with at least one of tensile force, heat, a cooling stream and a high pressure water force.

5. The method of claim 1, wherein the removable adhesive gel is protected before application by a removable liner enabling the double-sided tape to be stored in cut-to-fit bulk rolls.

6. The method of claim 4, wherein the removable adhesive gel includes an integral scrim fabric or imbedded fibrous material that facilitates its removal.

7. The method of claim 1, further comprising forming one or more drainage holes immediately above the DFE for reducing hydrodynamic pressure on the exterior surface of the home or building from flood waters that rise above the DFE.

8. The method of claim 1, further comprising positioning a rigid foam cover between a corner of the exterior surface of the home or building and the flexible sheet for protecting the flexible sheet.

9. The method of claim 1, further comprising installing a door protector adjacent an exterior side of each door in the exterior surface of the home or building to protect each door from flood waters up to at least the DFE.

10. The method of claim 1, further comprising installing a window protector adjacent an exterior side of each recessed window in the exterior surface of the home or building to protect each recessed window from flood waters up to at least the DFE.

11. The method of claim 1, further comprising covering each electrical outlet and each vent below the DFE in the exterior surface of the home or building.

12. The method of claim 1, further comprising sealing each toilet and each shower drain located at a ground level of the home or building.

13. The method of claim 1, further comprising sealing each wall appurtenance below the DFE in the exterior surface of the home or building.

14. A method for protecting a home or building with a slab-on-grade foundation from flood waters, which comprises:
confirming an exterior door is properly aligned with a respective door frame, a sill, and a threshold;
confirming the exterior door and the respective door frame are in working condition and are effectively sealed below the DFE;
determining a size of a waterproof flexible sleeve needed to protect the exterior door of the home or building from flooding between a bottom of the exterior door and a predetermined DFE;
positioning the flexible sleeve around and under the bottom of the exterior door, around each lower edge of the exterior door and around a portion of an interior lower end of the exterior door;
securing the flexible sleeve to the exterior door; and
closing the door to compress the flexible sleeve and form a water resistant barrier up to the predetermined DFE.

* * * * *